US007728944B2

(12) United States Patent
Hu et al.

(10) Patent No.: US 7,728,944 B2
(45) Date of Patent: Jun. 1, 2010

(54) TRANSFLECTIVE LIQUID CRYSTAL DISPLAY

(75) Inventors: Chih-Jen Hu, Hsin-Chu (TW);
Chih-Ming Chang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 207 days.

(21) Appl. No.: 11/776,560

(22) Filed: Jul. 12, 2007

(65) Prior Publication Data
US 2008/0088754 A1 Apr. 17, 2008

(30) Foreign Application Priority Data
Oct. 16, 2006 (TW) ............................... 95138052 A

(51) Int. Cl.
G02F 1/1333 (2006.01)
(52) U.S. Cl. ...................... 349/144; 349/114
(58) Field of Classification Search ....................... None
See application file for complete search history.

(56) References Cited

U.S. PATENT DOCUMENTS

| 5,245,450 | A* | 9/1993 | Ukai et al. ............... 349/144 |
| 6,888,604 | B2* | 5/2005 | Rho et al. ................ 349/146 |
| 2003/0147019 | A1* | 8/2003 | Sasaki ..................... 349/43 |
| 2004/0046725 | A1* | 3/2004 | Lee ....................... 345/88 |
| 2004/0135149 | A1* | 7/2004 | Cho et al. .................. 257/72 |
| 2004/0179160 | A1* | 9/2004 | Rhee et al. ................ 349/139 |
| 2005/0068477 | A1* | 3/2005 | Shin et al. ................. 349/106 |
| 2005/0094078 | A1* | 5/2005 | Kang ...................... 349/141 |
| 2005/0117092 | A1* | 6/2005 | Park et al. ................. 349/106 |
| 2005/0140916 | A1* | 6/2005 | Kume et al. ............... 349/156 |
| 2005/0237450 | A1* | 10/2005 | Hu et al. ................... 349/108 |
| 2006/0125983 | A1* | 6/2006 | Hu et al. ................... 349/114 |
| 2006/0262262 | A1* | 11/2006 | Kim et al. ................. 349/139 |
| 2006/0274234 | A1* | 12/2006 | Takizawa .................. 349/108 |
| 2007/0268433 | A1* | 11/2007 | Moon et al. ............... 349/114 |
| 2008/0158452 | A1* | 7/2008 | Wu ......................... 349/34 |

FOREIGN PATENT DOCUMENTS

| CN | 1103062 C | 3/2003 |
| CN | 1573480 A | 2/2005 |
| CN | 1720480 A | 1/2006 |
| CN | 1743922 A | 3/2006 |
| CN | 1844976 A | 10/2006 |
| TW | I228622 | 3/2005 |

* cited by examiner

Primary Examiner—Mike Stahl
(74) Attorney, Agent, or Firm—Winston Hsu

(57) ABSTRACT

A transflective LCD includes scan lines and data lines disposed on a substrate. The scan line and the data line forms a plurality of pixel regions. Each pixel region has a plurality of sub-pixel regions. At least three of the sub-pixel regions are as a color sub-pixel region and at least one of the sub-pixel regions is a fourth sub-pixel region. A plurality of switch devices is adapted to control the color sub-pixels and the fourth sub-pixel.

36 Claims, 21 Drawing Sheets

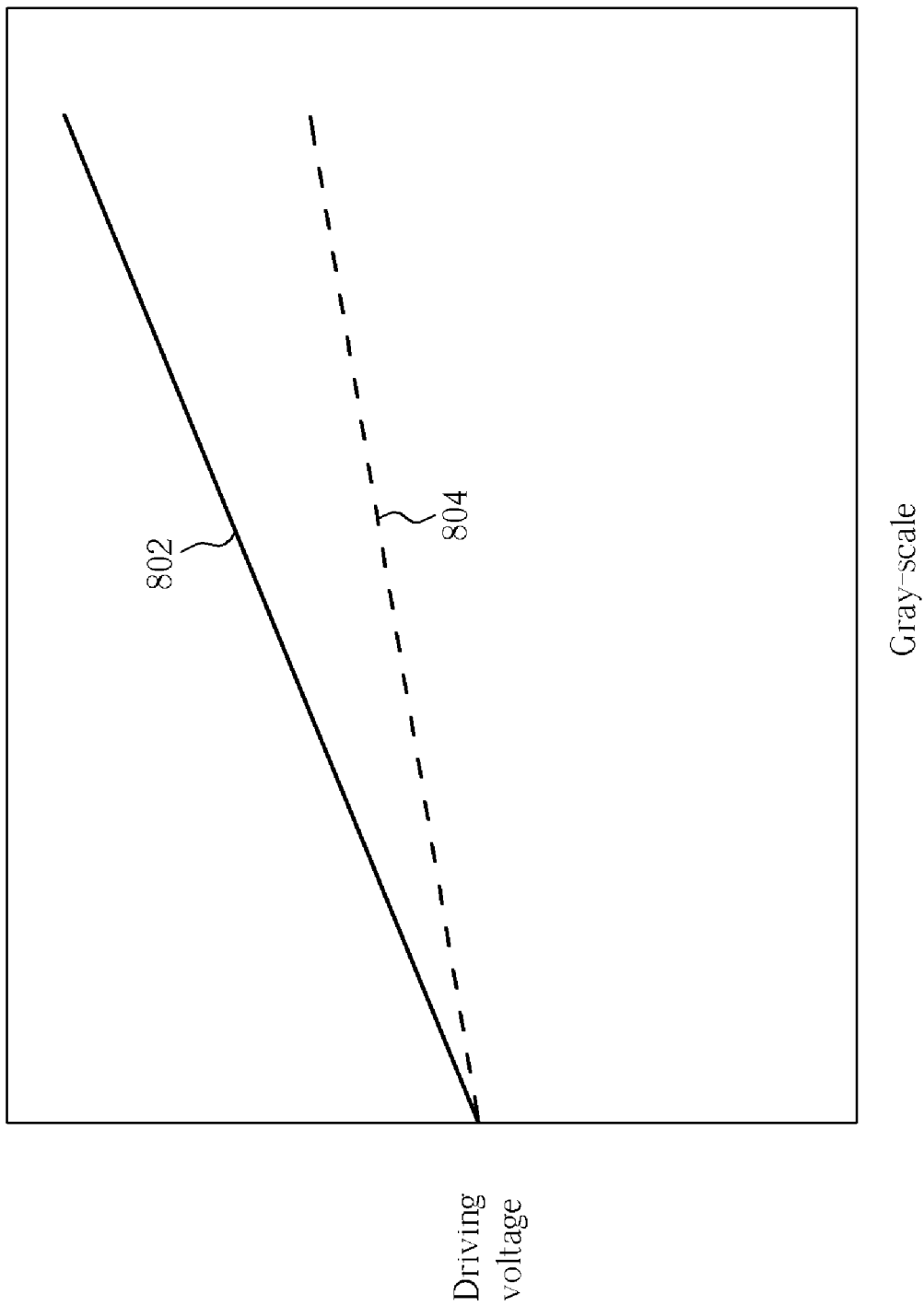

TRANSFLECTIVE LIQUID CRYSTAL DISPLAY

BACKGROUND OF THE INVENTION

1. Field of the Invention

The present invention relates to a transflective liquid crystal display (LCD) and, more particularly, to a transflective LCD with at least three color sub-pixel regions and at least a fourth sub-pixel region in one pixel region.

2. Description of the Prior Art

Thin film transistor (TFT) liquid crystal displays (LCD) are generally classified into reflective LCDs, transmissive LCDs, and transflective LCDs. In a reflective LCD, an ambient light in front of the panel into the panel, and is reflected by a reflective layer so that users can see what the LCD displays on the screen. In a transmissive LCD, a backlight module is installed below the panel for radiating light, and the radiated light will pass through the panel so that users can see what the LCD displays on the screen. In a transflective LCD, an ambient light and a backlight module are used simultaneously as light sources to illuminate the transflective LCD.

Generally speaking, only a little light formed by the backlight module really pass through the panel. Most of it is absorbed along the way including pass through an optical film and the panel. In addition, the transmissive LCD has a low contrast ratio under the light of the daytime or higher brightness light of the ambient. To solve the problem mentioned above, the LCDs on the market often have a transflective design.

The resolution of the LCD is increased, and the pixel is made smaller, but the size of the thin film transistors in the pixel cannot be decreased due to limitations of a fabrication process. So the ratio of pixels that the thin film transistors occupy is increased, and the open ratio of the LCD is decreased. To make a transflective LCD with a high open ratio is an important issue in the LCD field.

SUMMARY OF THE INVENTION

It is therefore one objective of the present invention to provide a transflective LCD to solve the above-mentioned problems.

According to the transflective LCD of the present invention, the transflective LCD comprises a plurality of scan lines disposed along a first direction on a substrate, a plurality of data lines disposed along a second direction on the substrate, so that a plurality of pixel regions comprising a plurality of sub-pixel regions defined by the data lines and the scan lines, and at least three of the sub-pixel regions as a color sub-pixel regions and at least one of the sub-pixel regions as a fourth sub-pixel region, wherein the color sub-pixel regions are a transmission region within a transmissive electrode; and a plurality of switch devices adapted to control the color sub-pixel regions and the fourth sub-pixel region.

According to another transflective LCD of the present invention, the transflective LCD comprises a plurality of scan lines disposed along a first direction on a substrate; a plurality of data lines, disposed along a second direction on the substrate, so that a plurality of pixel regions comprising a plurality of sub-pixel regions defined by the data line and the scan lines, and at least three of the sub-pixel regions as a color sub-pixel regions and at least one of the sub-pixel regions corresponding to the color sub-pixel regions as a fourth sub-pixel region, wherein the color sub-pixel regions are a transmission region within a transmissive electrode; and a plurality of switch devices adapted to control the color sub-pixel regions and the fourth sub-pixel region.

The thin film transistors are adapted to control the sub-pixel regions are disposed in the reflection region, so the open ratio of the transmission region of the sub-pixel regions can be increased.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 21 is diagram of gray-scale of colorless and color sub-pixel regions vs. driving voltage of colorless and color sub-pixel regions in the present invention.

DETAILED DESCRIPTION

Figure 1:
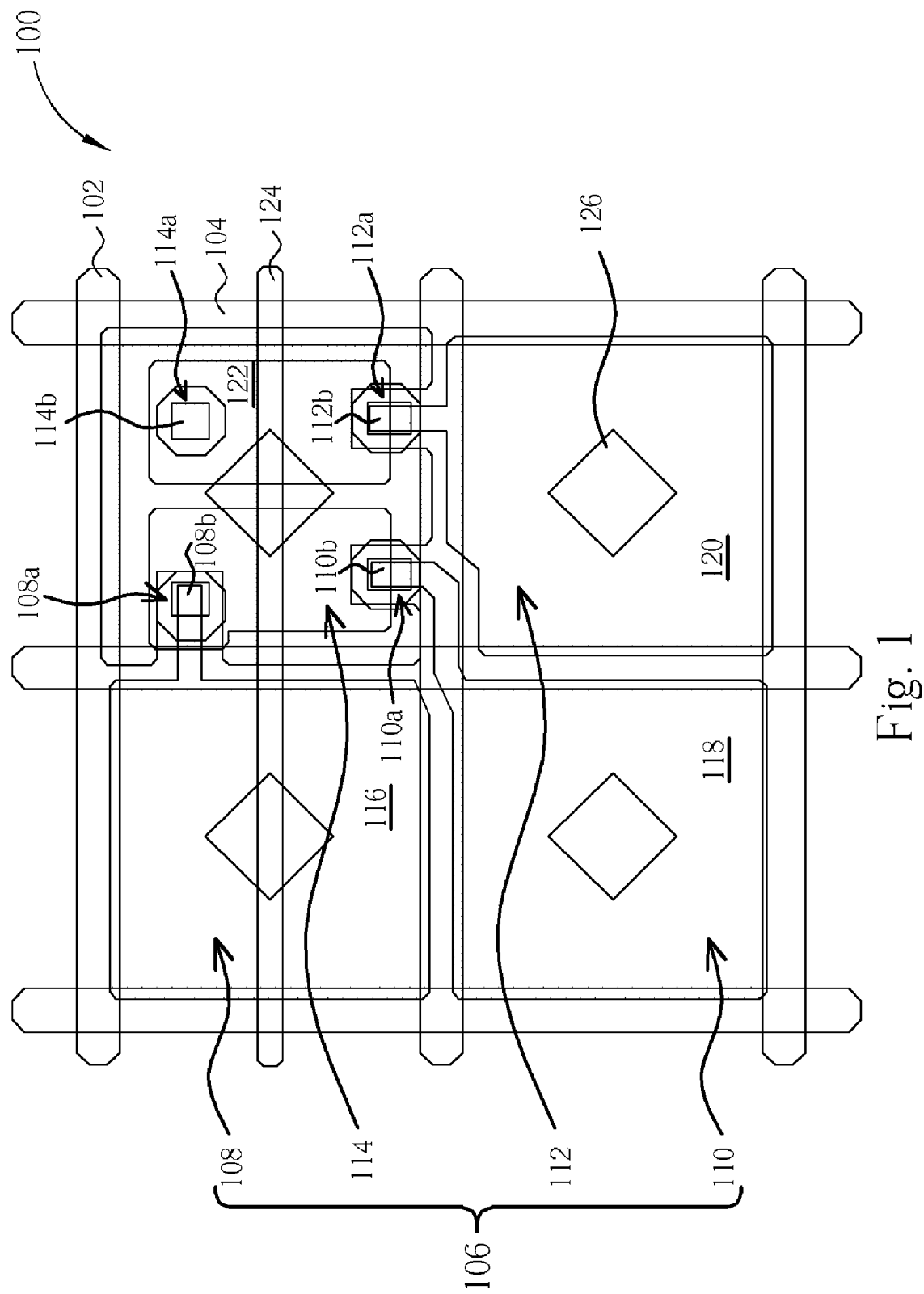
FIG. 1 is a schematic diagram of one embodiment of structure of transflective LCD in the present invention.

FIG. 1 is a schematic diagram of one embodiment of structure of a transflective LCD in the present invention. The transflective LCD 100 comprises: a plurality of scan lines 102 disposed along a first direction on a substrate, and a plurality of data lines 104 disposed along a second direction on the substrate. A plurality of pixel regions 106 are defined by the data line 106 and the scan lines 102, and each pixel region comprising a plurality of sub-pixel regions 108, 110, 112, 114. Each of the sub-pixel regions 108, 110, 112 is as a color sub-pixel region comprises red, green, blue, or other colors (such as yellow, brown, purple, and so on). The sub-pixel region 114 comprises a colorless pixel region, a color that is substantially equal to any one of the colors in the sub-pixel regions 108, 110, 112, or a color that is substantially different from one of the colors in the sub-pixel regions 108, 110, 112. For example, other than red, green and blue, which can be used, yellow, brown, purple, and so on can also be used. In the embodiment of the present invention, for example, the sub-pixel regions 108, 110, 112 are red, green, and blue, respectively, and the sub-pixel region 114 is colorless. In addition, the sub-pixel regions 108, 110, 112 are as transmission regions, each transmission region comprising a transmissive electrode 116, 118, and 120 respectively, and the sub-pixel region 114 is as a reflective region comprising a reflective electrode 122. Thin film transistors (TFTs) 108a, 110a, 112a, 114a are used as switch devices for the sub-pixel regions 108, 110, 112, 114, respectively. The thin film transistors 108a, 110a, 112a, 114a are disposed under a part of the reflective electrode 122 in the sub-pixel region 114, the structures of the thin film transistors 108a, 110a, 112a, 114a comprise bottom-gate type (such as back-channel etched, etching stopper, or others) or top-gate type, and the implant types of the thin film transistors 108a, 110a, 112a, 114a comprise N-type, P-type, or combinations thereof. The fabrication process of the thin film transistors 108a, 110a, 112a, 114a comprises amorphous silicon processes, poly silicon processes, and single silicon processes, a microcrystalline silicon processes, or combinations thereof.

Taking the sub-pixel region 108 as an example, the transmissive electrode 116 in the sub-pixel region 108 crosses the data line 104 to the sub-pixel region 114, and the transmissive electrode 116 is coupled to the thin film transistor 108a by a contact hole 108b. The transmissive electrodes 118, 120 in the sub-pixel regions 110, 112 also cross the scan line 102 and the data line 104 to couple the thin film transistors 110a, 112a by contact holes 110b, 112b which are in the sub-pixel region 114. Preferably, the pixel region 106 comprises a common electrode 124 to form a capacitor, but not-limited it, could be selectively to form a capacitor by used another method (such as capacitor on gate, capacitor on common, or combinations thereof). The common electrode 124 is substantially parallel to the scan line 102 and is disposed between the scan lines 102. The common electrode 124 passes through the sub-pixel region 108 and the sub-pixel region 114 and is under the reflective electrode 122 of the sub-pixel region 114. In this embodiment, the switch device, such as a thin film transistor, is disposed in the reflective region of the sub-pixel region 114 to increase the open ratio of the transmission of the sub-pixel regions 108, 110, 112. In addition, the switch device, the capacitor, and the common electrode 124 of the colorless sub-pixel region 114 are under the reflective electrode 122 so the efficiency of the reflective region is kept. In this embodiment, each sub-pixel region has at least one alignment device (not shown), such as a protrusion 126 (which can be seen as a first alignment device) and/or a slit 130 (which can be seen as a second alignment device) to form a multi-domain view angle (MVA) LCD or an in-plane switch (IPS) LCD.

Figure 2:
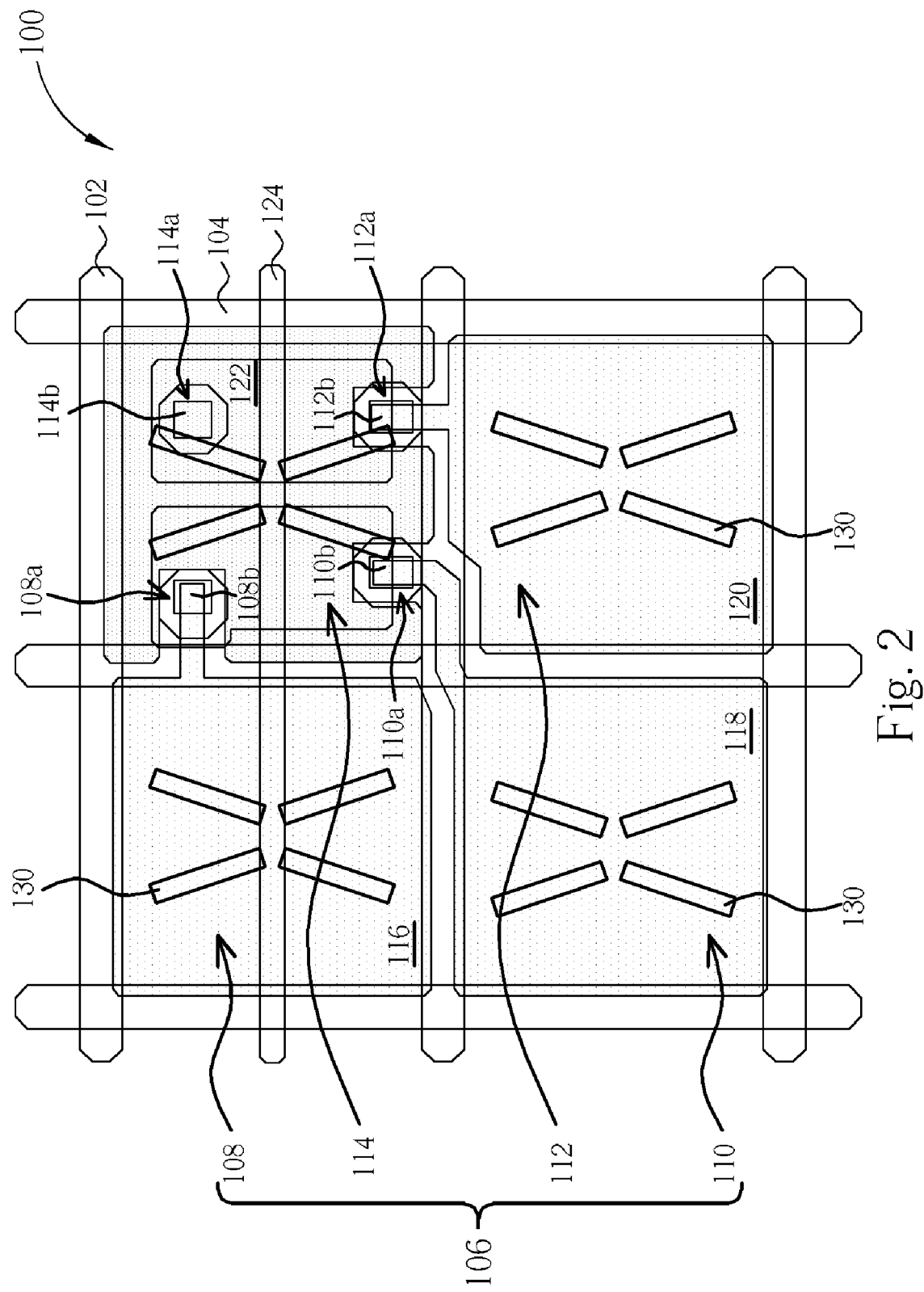
FIG. 2 to FIG. 6 are schematic diagrams of structures of varied types of photo-spacers and the alignment device (such as at least one of slits and protrusions) in FIG. 1
Figure 3:
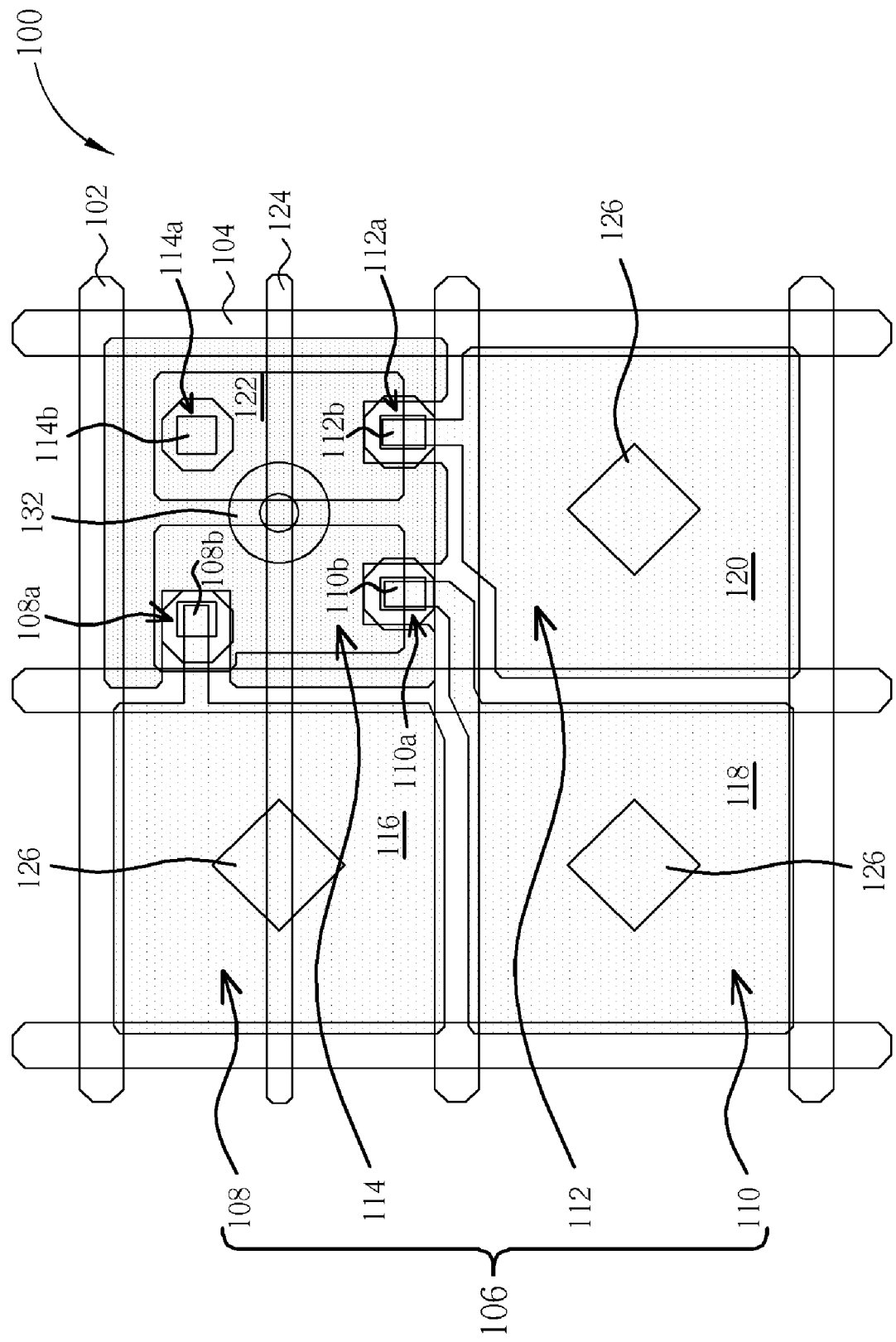
Figure 4:
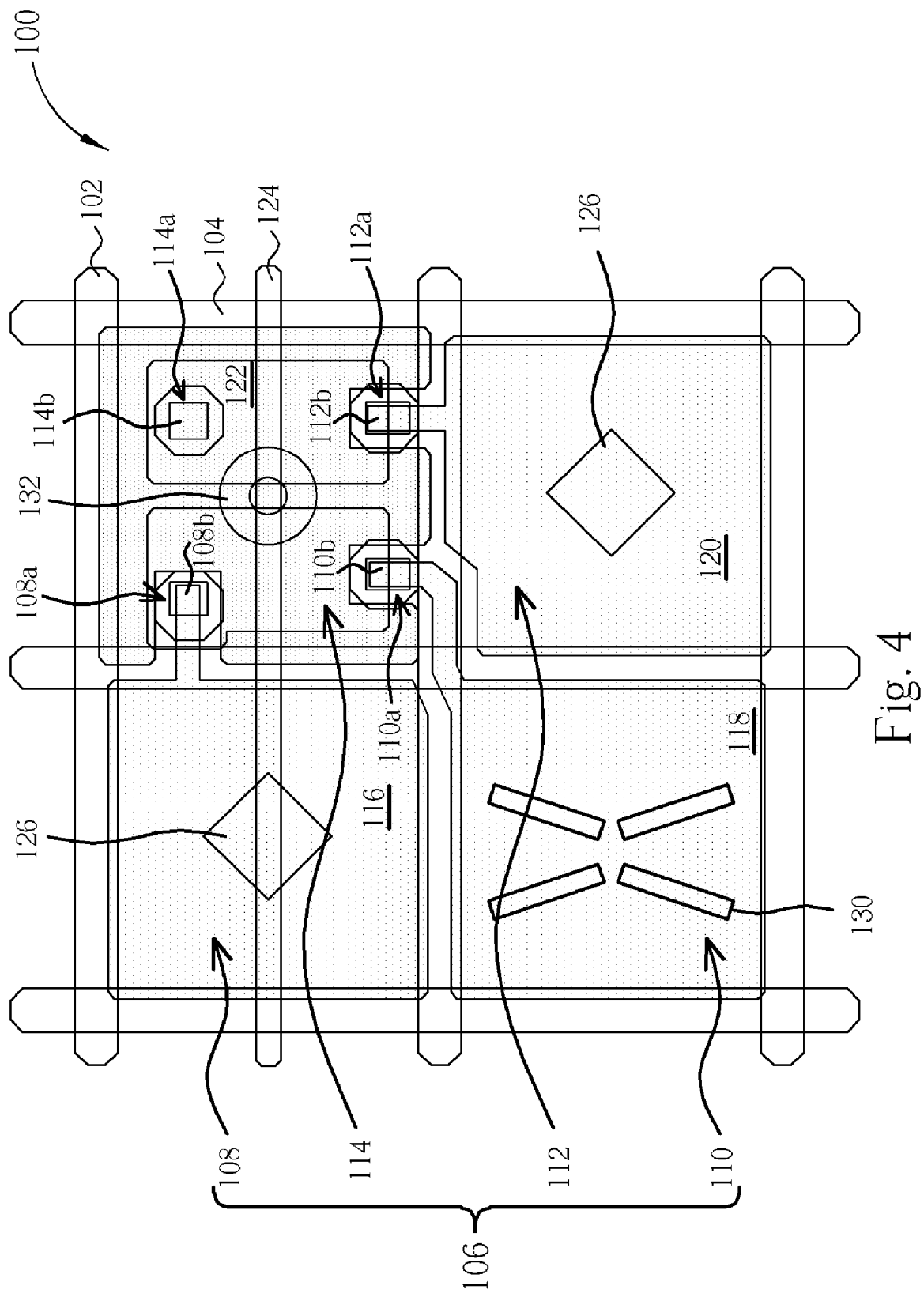
Figure 5:
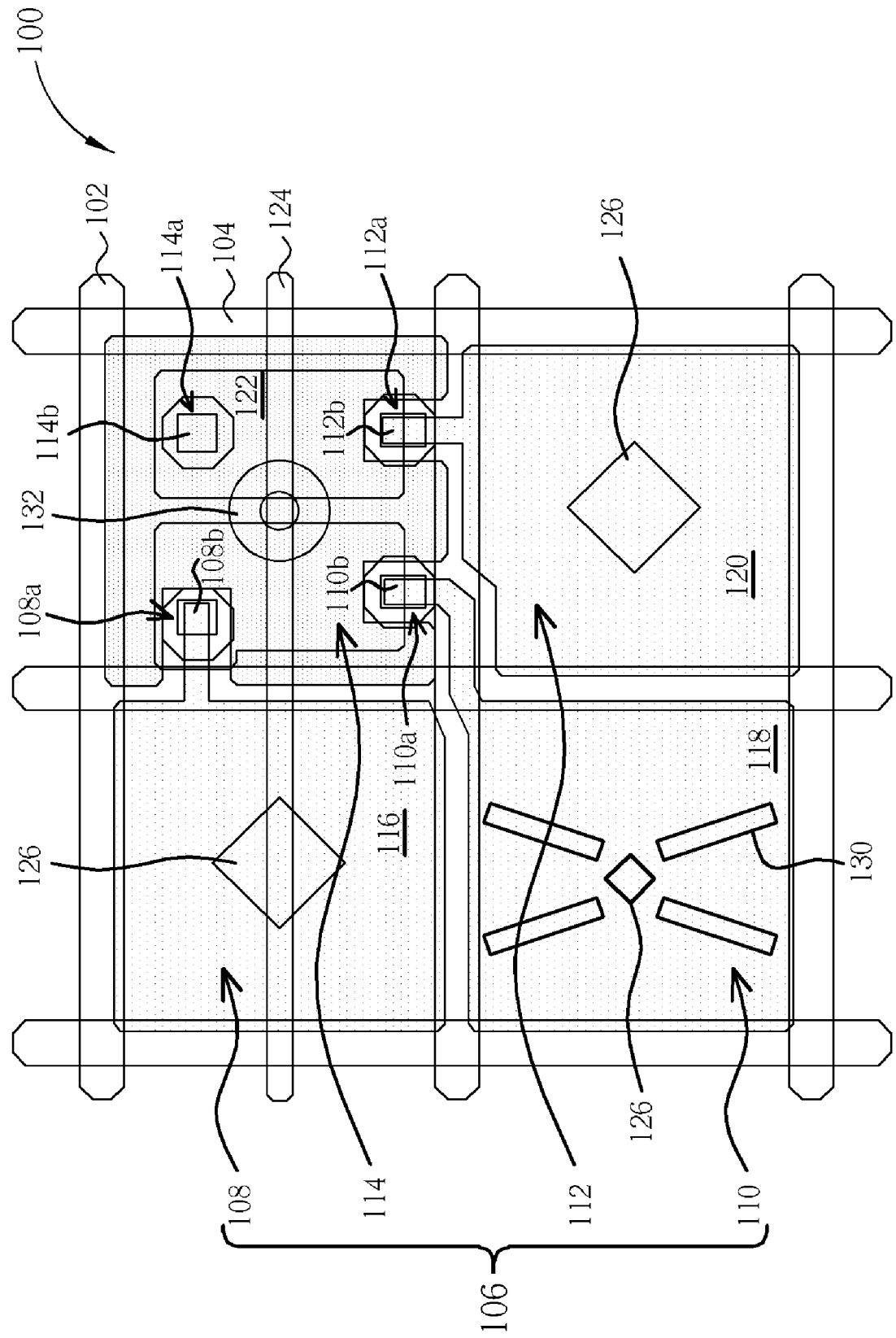

Referring to FIG. 2 to FIG. 6 are schematic diagrams of structures of varied types of the photo-spacers and the alignment device (such as at least one of slits and protrusions) in FIG. 1. FIG. 2 to FIG. 6 show various types in which the protrusions 126 of FIG. 1 are replaced by either the slits 130 or the photo-spacers 132. Referring to FIG. 2, all of the protrusions 126 are replaced by the slits 130. The slit 130 can be X-shaped, strip shaped, W-shaped, fish bone shaped, comb shaped, L-shaped, boomerang shaped, V-shaped, stellar shaped, or another shape, or combinations thereof. In FIG. 3, the protrusion 126 in the colorless sub-pixel region 114 is replaced by the photo-spacer 132. The photo-spacers 132 can maintain the height of the liquid crystal layer and can provide the function of the protrusions 126 so that the open ratio is increased. In FIG. 4, the color sub-pixel regions 108, 112 comprise the protrusions 126, the color sub-pixel region 110 comprises the slits 130, and the colorless sub-pixel region 114 comprises the photo-spacer 132. In FIG. 5, the color sub-pixel region 110 comprises both the slits 130 and the protrusion 126. In the present invention, not only can one sub-pixel region have both the protrusion and the slits, but also more than one or the entire sub-pixel regions can also have both the protrusion and the slits.

Figure 6:
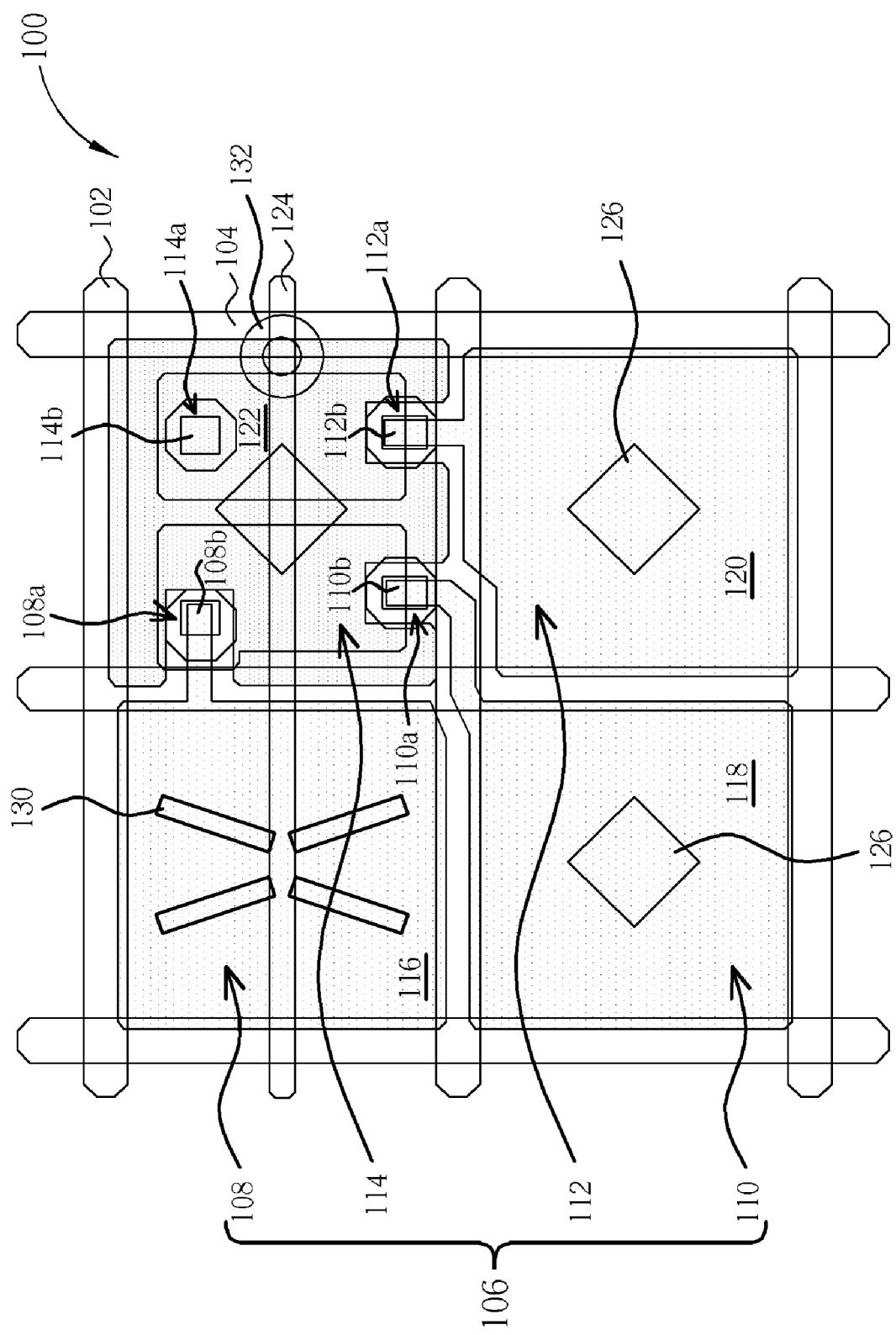

In FIG. 6, the color sub-pixel regions 110, 112 and the colorless sub-pixel region 114 have the protrusions 126, and the color sub-pixel region 108 has the slits 130. In addition, preferably, another photo-spacer 132 is disposed between the colorless sub-pixel region 114 and another sub-pixel region (not shown) is adjacent to the colorless sub-pixel region 114, and the color of the another sub-pixel region (not shown) which is adjacent to the colorless sub-pixel region 114 comprises colorless, color that is substantially equal to one of the color sub-pixel regions 108, 110, 112, or color that is substantially different from the color sub-pixel regions 108, 110, 112, which means there are several possible variations, such as: all the color sub-pixel regions 108, 110, 112 and the colorless sub-pixel region 114 comprising the protrusions 126 or the slits 130, or some color sub-pixel regions and the colorless sub-pixel region having protrusions 126 and some having the slits 130. The photo-spacer 132 can also be disposed in the colorless sub-pixel region 114 or is disposed between the colorless sub-pixel region 114 and another sub-pixel region (not shown), which is adjacent to the colorless sub-pixel region 114.

Figure 7:
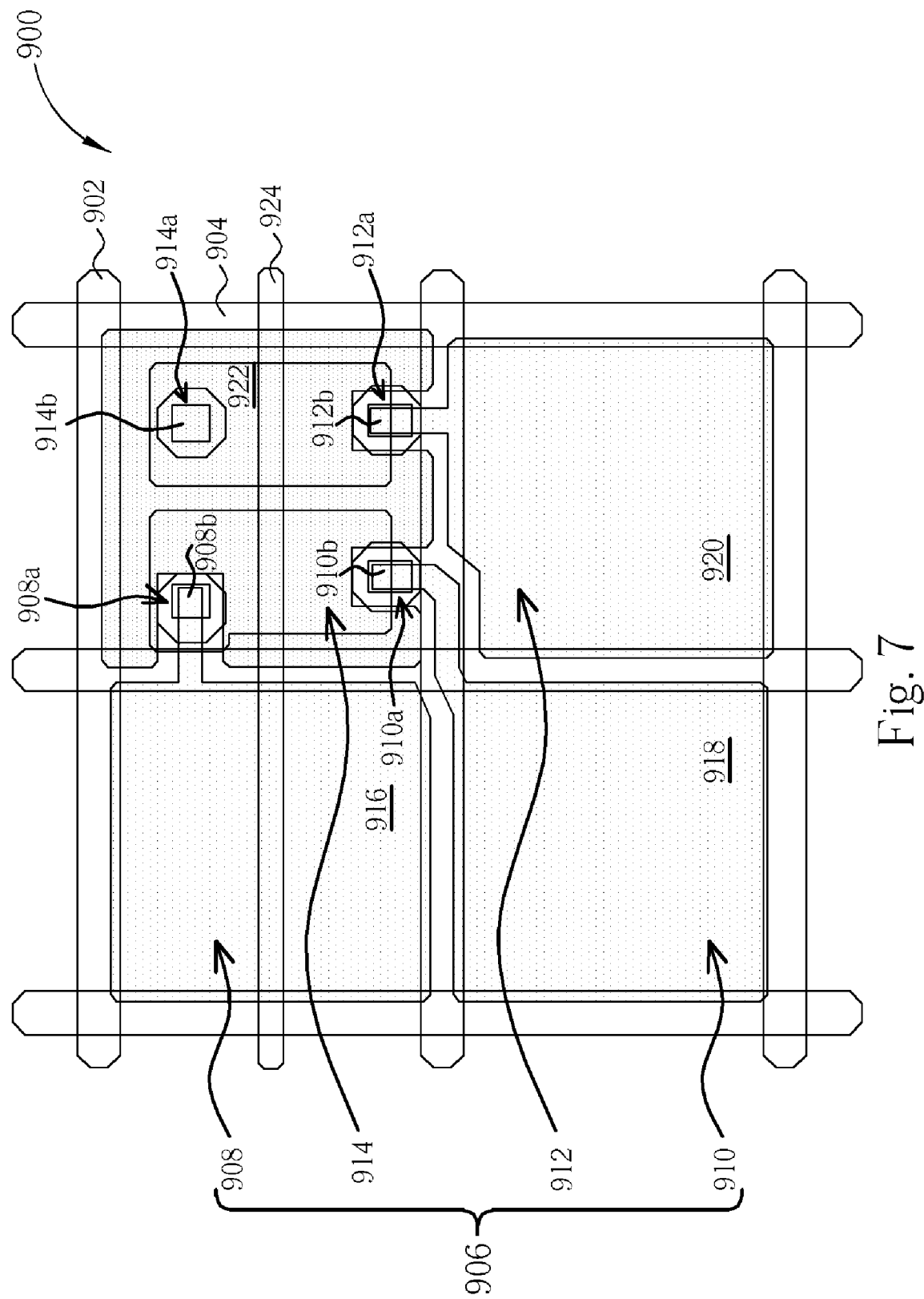
FIG. 7 is a schematic diagram of another embodiment of structure of transflective LCD in the present invention.

Referring to FIG. 7 is a schematic diagram of another embodiment of structure of transflective LCD in the present invention. The structure in FIG. 7 does not have protrusions, which is different from FIG. 1. The transflective LCD 900 comprises a plurality of scan lines 902 disposed along a first direction on a substrate, and a plurality of data lines 904 disposed along a second direction on the substrate. A plurality of pixel regions 906 are defined by the data lines 904 and the scan lines 902, and each pixel region comprising a plurality of sub-pixel regions 908, 910, 912, 914. Each of The sub-pixel regions 908, 910, 912 is as a color sub-pixel region comprise red, green, and blue, other colors (such as yellow, brown, purple, and so on). The sub-pixel region 914 comprises the colorless pixel region, color that is substantially equal to any one of the colors in the sub-pixel regions 908, 910, 912, or color that is substantially different from any one of the colors in the sub-pixel regions 908, 910, 912. For example, other than using red, green, blue, yellow, brown, and purple can also be used. In the embodiment of the present invention, for example, the sub-pixel regions 908, 910, 912 are red, green, and blue, respectively, and the sub-pixel region 914 is colorless. In addition, each the sub-pixel regions 908, 910, 912 are as a transmission regions, each transmission region comprising transmissive electrode 916, 918, and 920, and the sub-pixel region 914 is as a reflective region comprising a reflective electrode 922. The thin film transistors 908a, 910a, 912a, 914a are used as switch devices for the sub-pixel regions 908, 910, 912, 914, respectively. The thin film transistors 908a, 910a, 912a, 914a are disposed under the reflective electrode 922 in the sub-pixel region 914, the structures of the thin film transistors 908a, 910a, 912a, 914a can be bottom-gate type (such as back-channel etched, etching stopper, or others) or top-gate type, and the implant types of the thin film transistors 908a, 910a, 912a, 914a can be N-type, P-type, or combinations thereof. The fabrication process of the thin film transistors 908a, 910a, 912a, 914a can be an amorphous silicon process, a poly silicon process, a single silicon process, microcrystalline silicon processes, or combinations thereof.

Taking the sub-pixel region 908 as an example, the transmissive electrode 916 in the sub-pixel region 908 crosses the data lines 904 to the sub-pixel region 914, and the transmissive electrode 916 is coupled to the thin film transistor 908a by a contact hole 908b. The transmissive electrodes 918, 920 in the sub-pixel regions 910, 912 also cross the scan lines 902 and the data lines 904 to couple the thin film transistors 910a, 912a by the contact holes 910b, 912b which are in the sub-pixel region 914. Preferably, the pixel region 906 comprises a common electrode 924 to form a capacitor, but not-limited it, could be selectively to form a capacitor by used another method (such as capacitor on gate, capacitor on common, or combinations thereof). The common electrode 924 is substantially parallel to the scan lines 902 and is disposed between the scan lines 902. The common electrode 924 passes through the sub-pixel region 908 and the sub-pixel region 914, and is under the reflective electrode 922 of the sub-pixel region 914. In this embodiment, the switch device, such as a thin film transistor, is disposed in the colorless sub-pixel region 914 of the reflective region to increase the open ratio of the sub-pixel regions 908, 910, 912. In addition, the switch device, the capacitor, and the common electrode 924 in the colorless sub-pixel region 914 are under a part of the reflective electrode 922, so the efficiency of the reflective region is saved.

Figure 8:
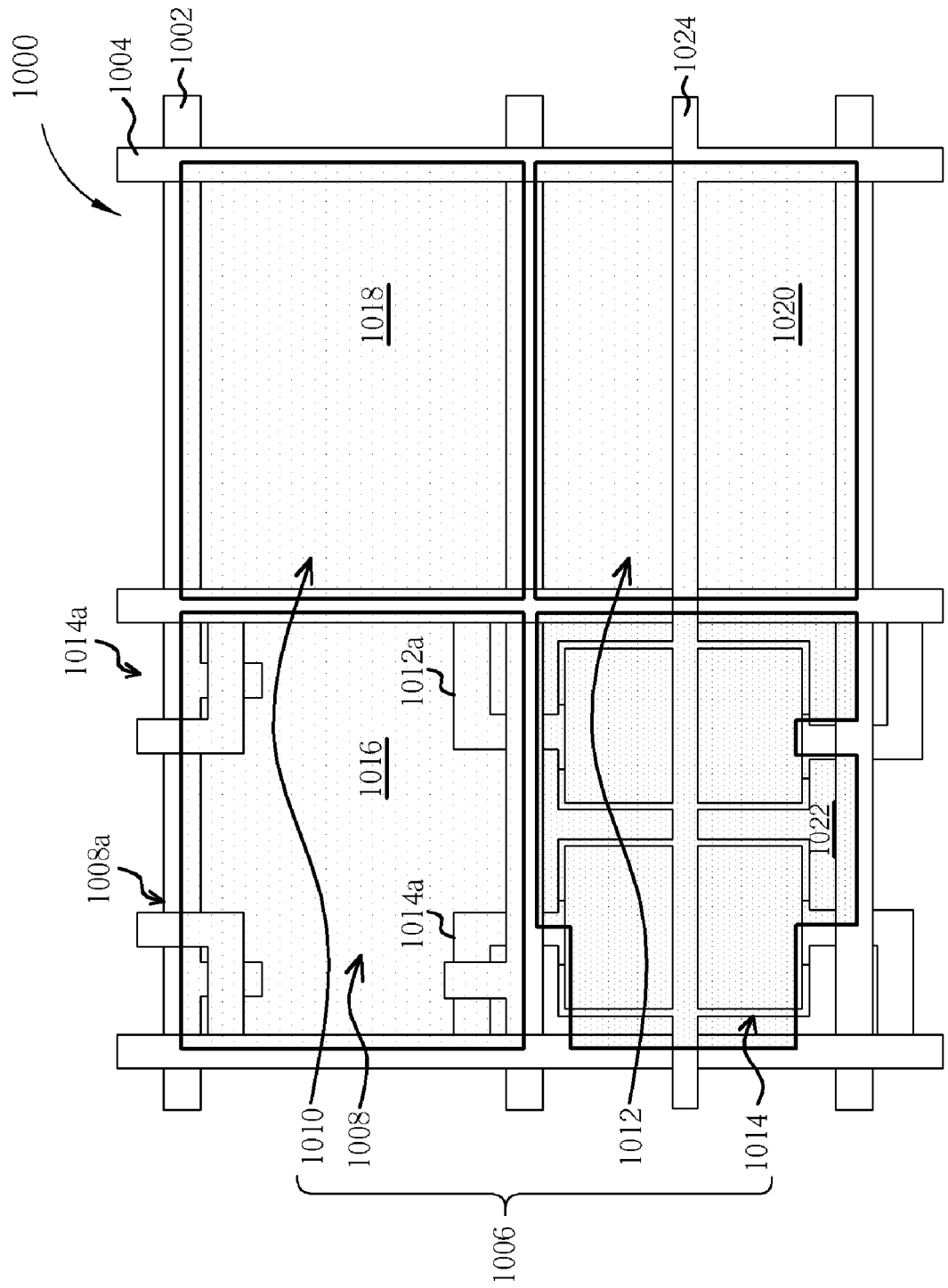
FIG. 8 is a schematic diagram of another embodiment of structure of transflective LCD in the present invention.

Referring to FIG. 8 is a schematic diagram of another embodiment of the structure of transflective LCD in the present invention. The structure of the thin film transistor in this embodiment is a top-gate structure formed by a low temperature poly silicon (LTPS) process. The transflective LCD 1000 comprises: a plurality of scan lines 1002 disposed along a first direction on a substrate, and a plurality of data lines 1004 disposed along a second direction on the substrate. A plurality of pixel regions 1006 are defined by the data lines 1004 and the scan lines 1002, and each pixel region comprising a plurality of sub-pixel regions 1008, 1010, 1012, 1014. Each of the sub-pixel regions 1008, 1010, 1012 is as a color sub-pixel region comprises red, green, and blue, or other colors (such as yellow, brown, purple, and so on). The sub-pixel region 1014 comprises the colorless pixel region, color which is substantially equal to any one of the colors in the sub-pixel regions 1008, 1010, 1012 or color which is substantially different from any one of the colors in the sub-pixel regions 1008, 1010, 1012. For example, other than red, green and blue, which can be used, yellow, brown, and purple can also be used. In the embodiment of the present invention, for example, the sub-pixel regions 1008, 1010, and 1012 are red, green, and blue, respectively, and the sub-pixel region 1014 is colorless. In addition, the sub-pixel regions 1008, 1010, and 1012 are as transmission regions, each transmission region comprising a transmissive electrode 1016, 1018, and 1020, and the sub-pixel region 1014 is as a reflective region comprising a reflective electrode 1022. The thin film transistors 1008a, 1010a, 1012a, 1014a are used as switch devices of the sub-pixel regions 1008, 1010, 1012, 1014, respectively, and the thin film transistors 1008a, 1010a, 1012a, 1014a are disposed in the sub-pixel regions 1008, 1014. In other words, a part of the thin film transistors 1008a, 1010a, 1012a, 1014a can be in the colorless sub-pixel region 1014, and another part can be in any one of the color sub-pixel regions 1008, 1010, and 1012 which is adjacent to the colorless sub-pixel region 1014. Preferably, the pixel region 1006 comprises a common electrode 1024 to form a capacitor, but not-limited it, could be selectively to form a capacitor by used another method (such as capacitor on gate, capacitor on common, or combinations thereof). The common electrode 1024 is substantially parallel to the scan line 1002 and is disposed between the scan lines 1002. The common electrode 1024 passes through the sub-pixel region 1012 and the sub-pixel region 1014.

Figure 9:
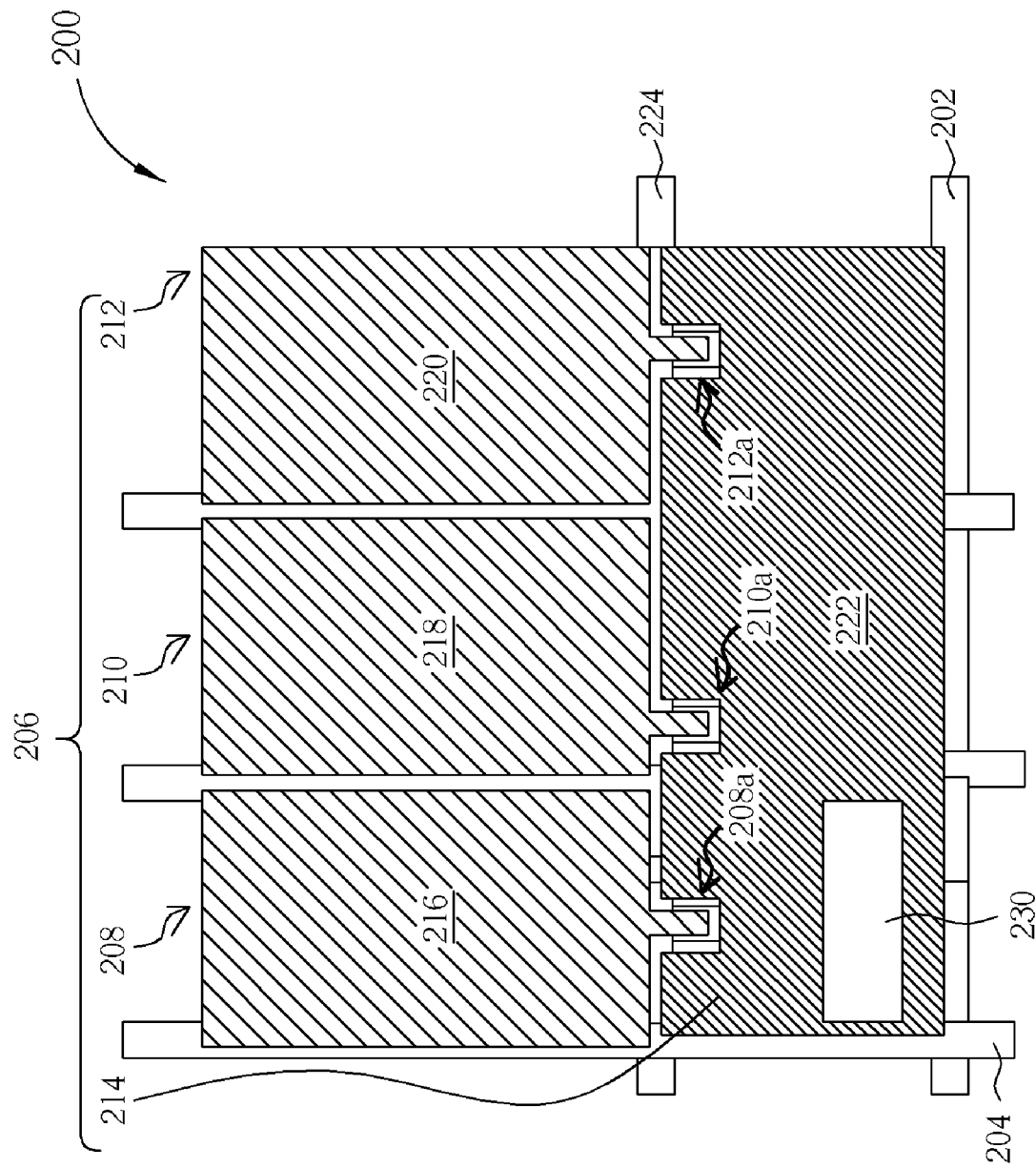
FIG. 9 to FIG. 10 are schematic diagrams of another embodiment of structure of transflective LCD in the present invention.
Figure 10:
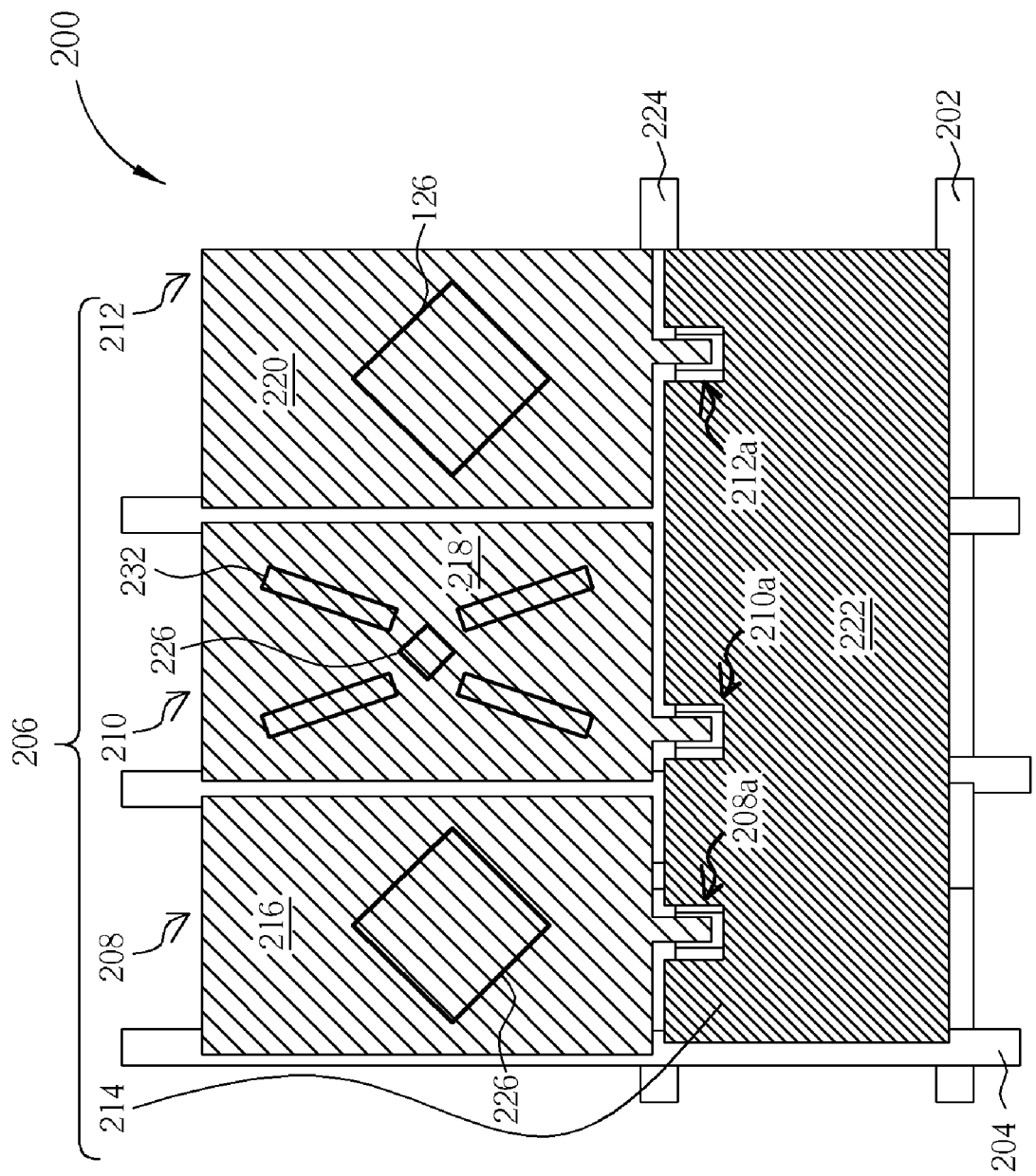

Referring to FIG. 9 to FIG. 10 are schematic diagrams of another embodiment of structure of transflective LCD in the present invention. The transflective LCD 200 comprises a plurality of scan lines 202 disposed along a first direction on a substrate, and a plurality of data lines 204 disposed along a second direction on the substrate. A plurality of pixel regions 206 are defined by the data lines 204 and the scan lines 202, and each pixel region comprising a plurality of sub-pixel regions 208, 210, 212, 214. Each of the sub-pixel regions 208, 210, 212 is as a color sub-pixel region comprises red, green, and blue, or other colors (such as yellow, brown, purple, and so on). The sub-pixel region 214 comprises the colorless pixel region, color which is substantially equal to any one of the colors in the sub-pixel regions 208, 210, 212, or color which is substantially different from one of the colors in the sub-pixel regions 208, 210, 212. For example, other than red, green, which can be used, blue, yellow, brown, and purple can also be used. In the embodiment of the present invention, for example, the sub-pixel regions 208, 210, 212 are red, green, and blue, respectively, and the sub-pixel region 214 is colorless. In addition, the sub-pixel regions 208, 210, 212 are as transmission regions, each transmission region comprising a transmissive electrode 216, 218, and 220 and the sub-pixel region 214 is as a reflective region comprising a reflective electrode 222. The thin film transistors 208a, 210a, 212a are used as switch devices of the sub-pixel regions 208, 210, 212, respectively. The thin film transistors 208a, 210a, 212a are disposed under a part of the reflective electrode 222 and a thin film transistor (not shown) is adapted to control the sub-pixel region 214 is disposed under the reflective electrode 222. The structures of the thin film transistors 208a, 210a, 212a can be bottom-gate type (such as back-channel etched, etching stopper, or others) or top-gate type, and the implant type of the thin film transistors 208a, 210a, 212a comprise N-type, P-type, or combinations thereof. The fabrication process of the thin film transistor 208a, 210a, 212a can be an amorphous silicon process, a poly silicon process, a single silicon process, a microcrystalline silicon processes, or combinations thereof. Preferably, the pixel region 206 comprise the common electrode 224 is substantially parallel to the scan lines 202, and the common electrode 224 is disposed between the sub-pixel regions 208, 210, 212 and the colorless sub-pixel region 214 and is under the reflective electrode 222. The colorless sub-pixel region 214 corresponds to the color sub-pixel regions 208, 210, 212, which is different from FIG. 1. In other words, each sub-pixel region has at least one transmission region within a transmissive electrode and at least one reflective region within a reflective electrode, each reflective electrode in the different sub-pixels of each pixel region is connected each other, and the reflective electrode is controlled by one TFT (not shown) which is disposed under any one of the reflective region of one pixel.

In the transflective LCD 200 in the present invention, the color sub-pixel regions 216, 218, 220 can be controlled to turned on or off by the thin film transistors 208a, 210a, 212a which receive signals from the data lines 204 and the scan lines 202. For one preferred embodiment in the present invention, the colorless sub-pixel region 214 can be electrically connected to any one of the color sub-pixel regions 216, 218, 220 so that the sub-pixel region 214 can be turn on or off with any one of the color sub-pixel regions 216, 218, 220. For example, if the colorless sub-pixel region 214 is coupled to the blue sub-pixel region 220, when the blue sub-pixel region 220 is turn on, the colorless sub-pixel region 214 is turned on in the same time. In other words, the blue sub-pixel region 220 and the colorless sub-pixel region 214 receive the signal from identical data line and scan line. For another preferred embodiment in the present invention, the sub-pixel regions 216, 218, 220, 214 can be turned on or off respectively by disposing another data line is adapted to transmit signal to the colorless sub-pixel region 214. As shown in FIG. 9, the colorless sub-pixel region 214 is under the color sub-pixel regions 208, 210, 212. FIG. 10 is a variation of FIG. 9. The color sub-pixel regions 208, 212 comprise protrusions 226, and the color sub-pixel region 210 comprises both the protrusion 226 and slits 232. In this embodiment, one or more sub-pixel regions can have both the protrusions and the slits.

Note that the pixel region formed by four sub-pixel regions in the present invention can also be formed by six sub-pixel regions, eight sub-pixel regions, but not limited its number, and the areas of each the sub-pixel region can be substantially different from each other, substantially equal to each other, or partially different from thereof. Moreover, the colorless sub-pixel region covered by the reflective electrode either entire covered by reflective electrode or covered partly by the reflective electrode and partly by the transmissive electrode.

Figure 11:
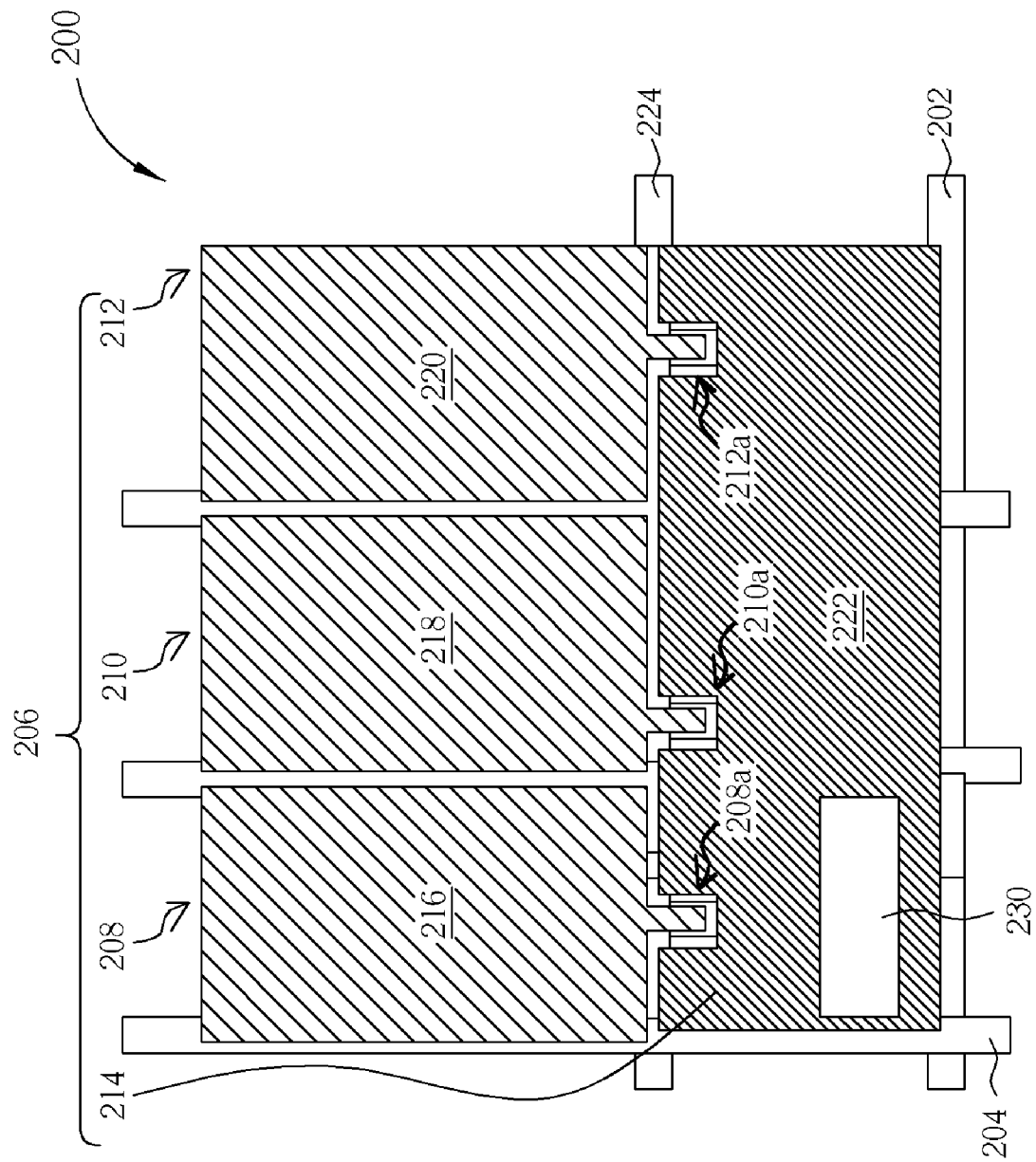
FIG. 11 to FIG. 13 depicts variation of structure related to FIG. 10.
Figure 12:
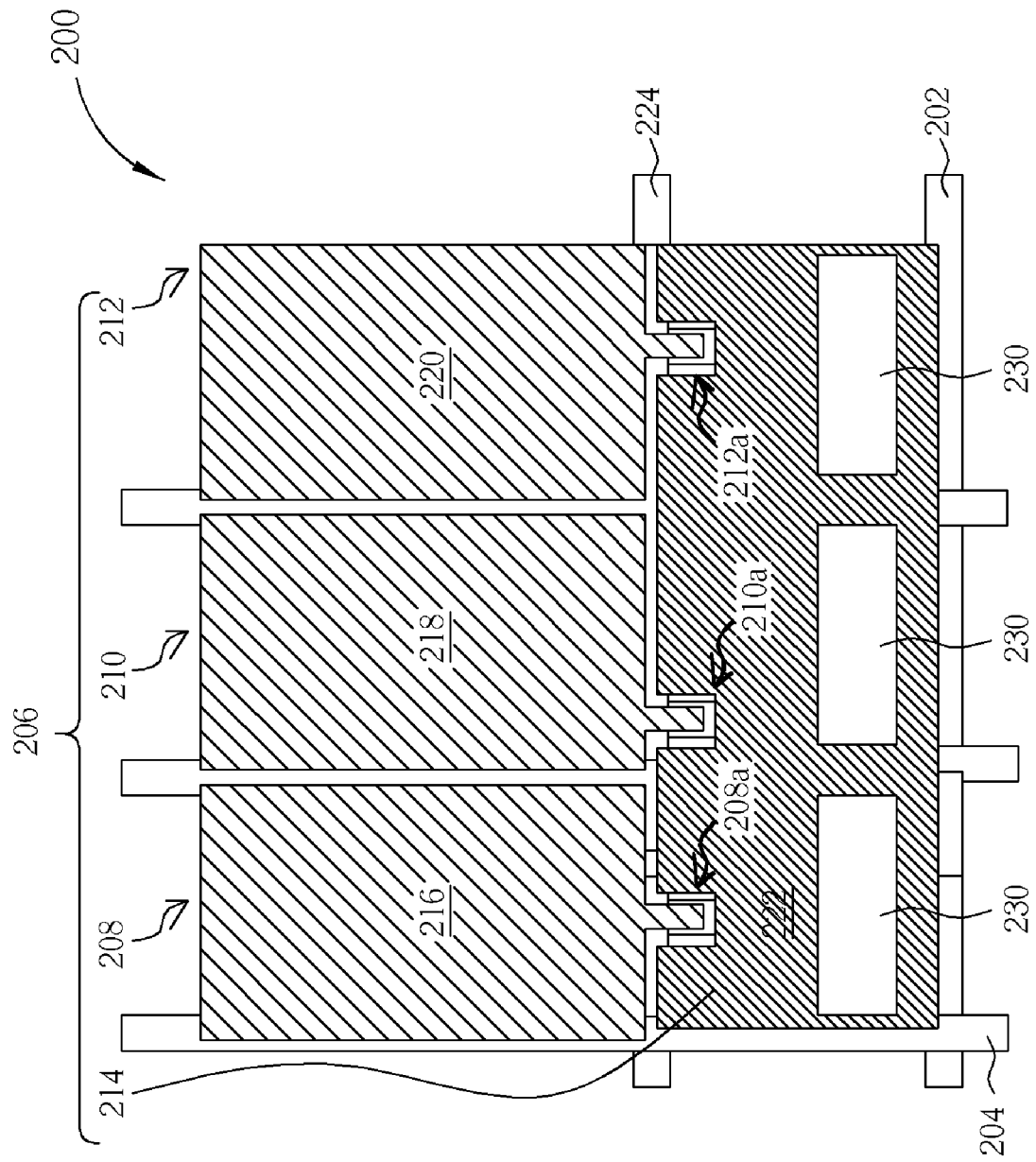
Figure 13:
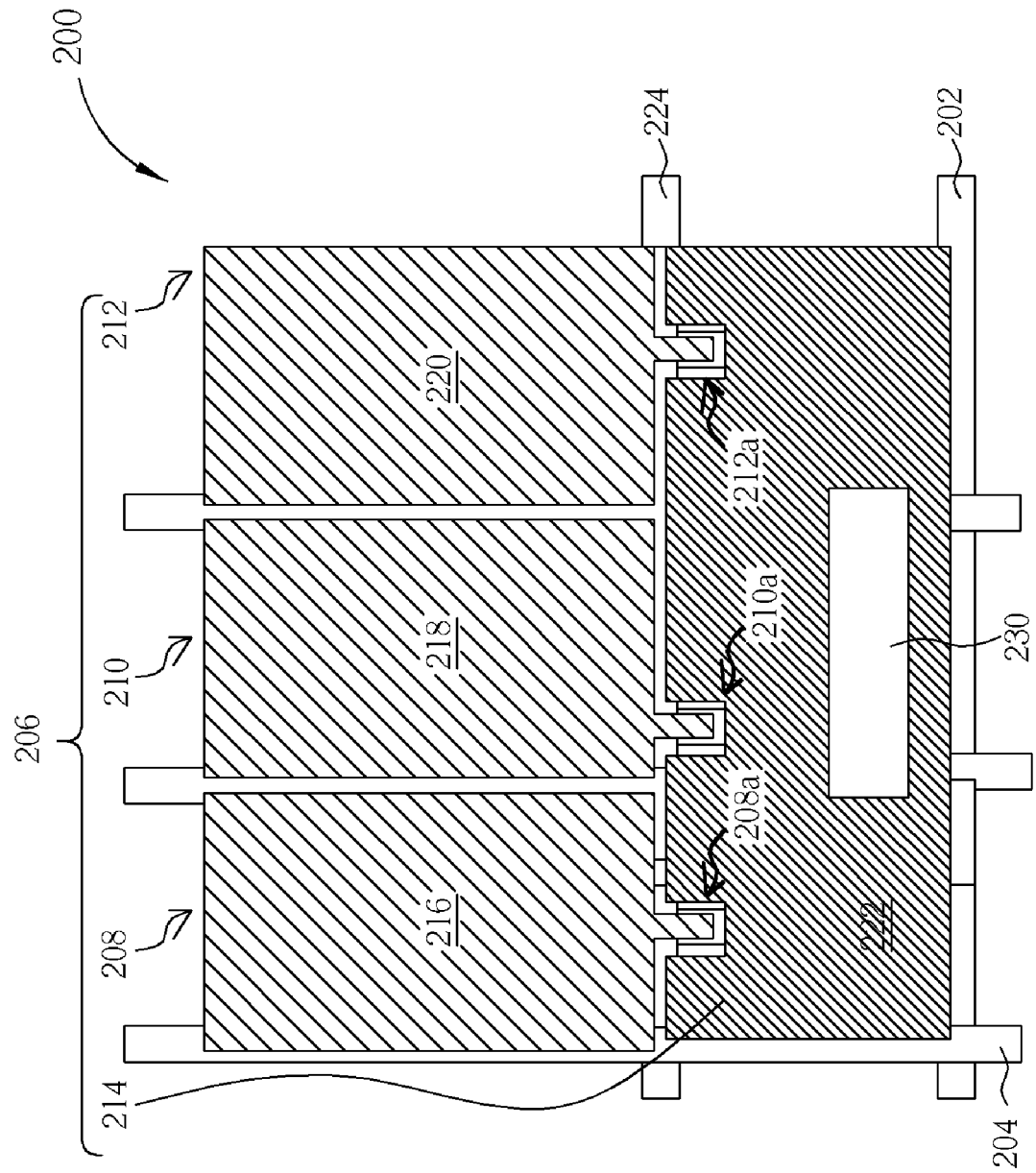

FIG. 11 to FIG. 13 show a variation of the structure related to FIG. 10. Referring to FIG. 11 show a transmission region 230 is disposed in the reflective electrode 222. The transmission region 230 is in a place where saturation is substantially lower to the human eye, such as a blue color red color, or others. In FIG. 12, a plurality of transmission regions 230 are disposed in the reflective electrode 222 and are under the reflective electrodes 216, 218, 220, respectively. Generally, the area of each the transmission region 230 can be substantially equal to each other, but at least one of the area of the transmission region 230 is substantially different from the other transmission regions. In FIG. 13, the transmission region 230 is at the substantially center of the reflective electrode 222, and has an area is substantially greater than the area of transmissions regions 230 in FIG. 11 and FIG. 12. The transmission region 230 in FIG. 13 crosses any two of the adjacent the data line. The shape of the transmission region 230 in the above-mentioned figures can be a substantially rectangle, a substantially circle, a substantially triangle, a substantially ellipse, a substantially semicircle, a substantially rhombus, a substantially trapezium, a substantially stellar shape, a substantially boomerang shape, or another substantially polygonal shape.

Figure 14:
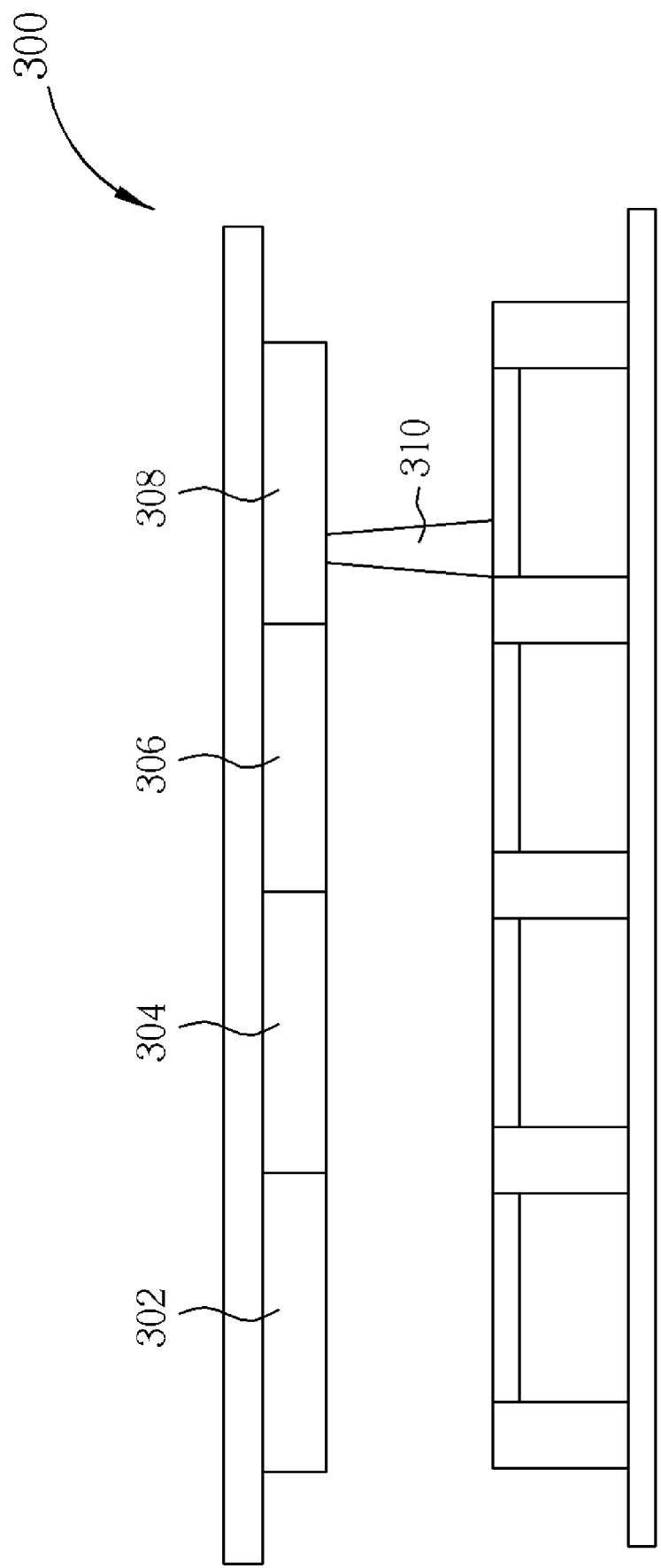
FIG. 14 to FIG. 17 are schematic diagrams of structure of the photo-spacer in the present invention.
Figure 15:
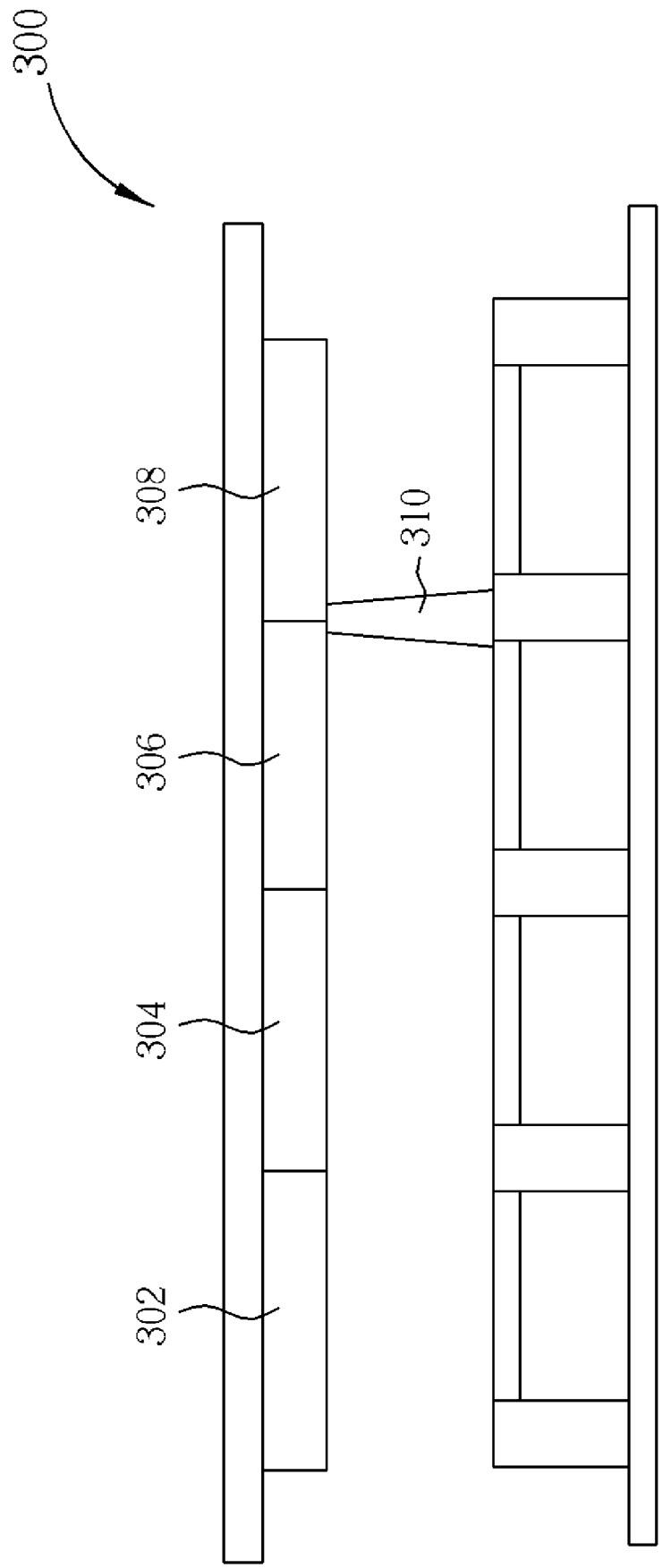
Figure 16:
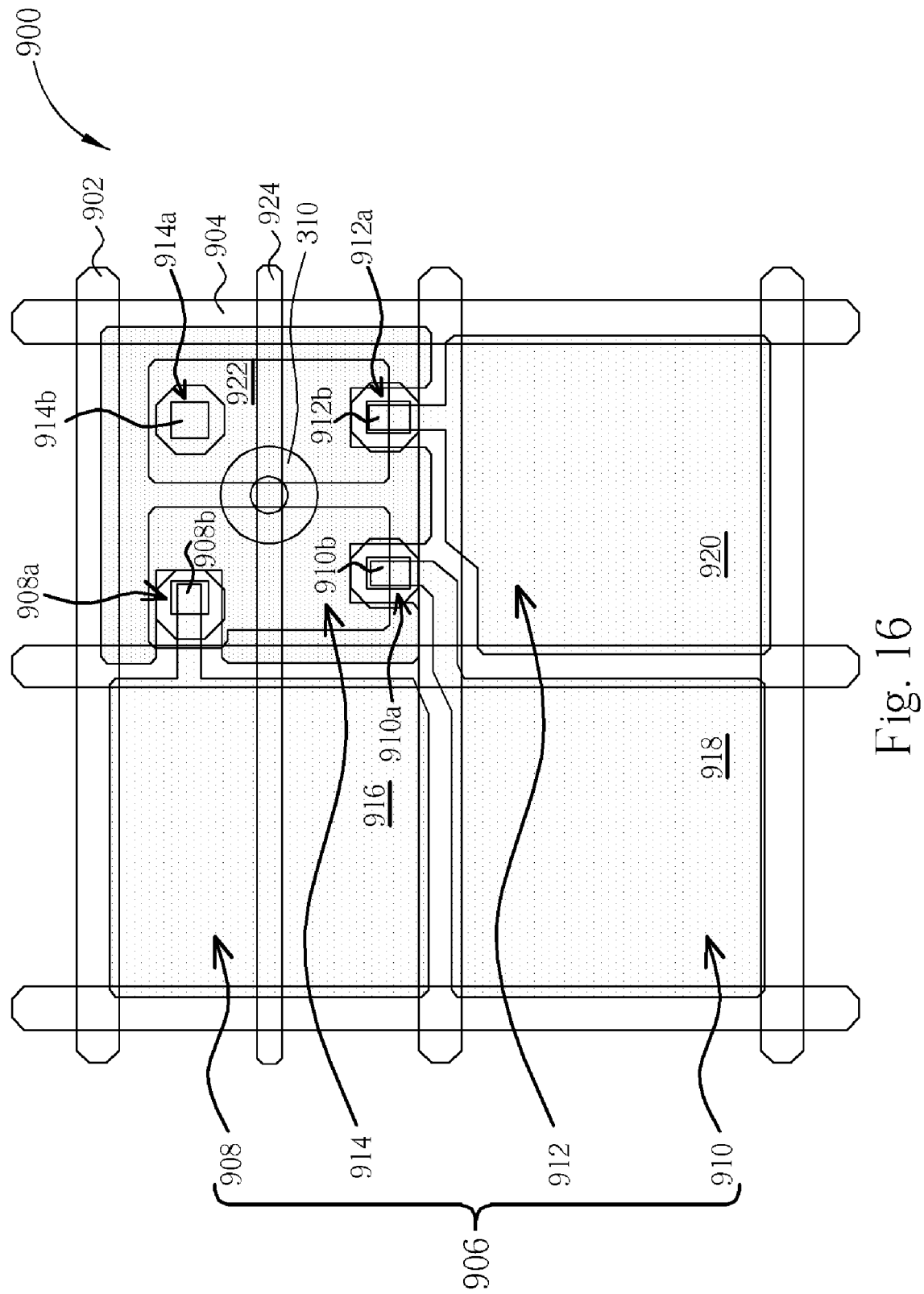
Figure 17:
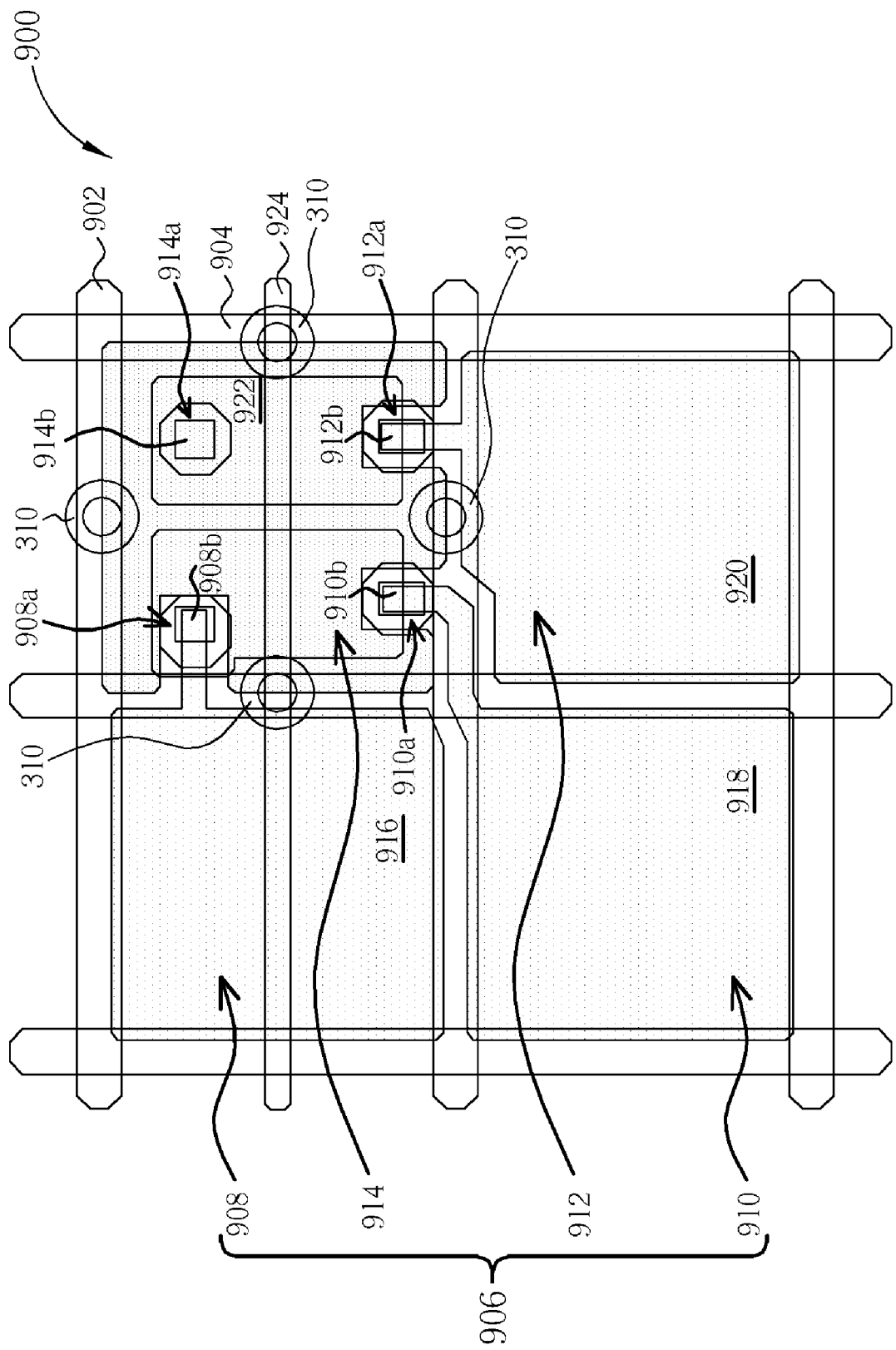

Referring to FIG. 14 to FIG. 17 are schematic diagrams of structure of the photo-spacer in the present invention. As shown in FIG. 14, the transflective LCD 300 comprises a plurality of sub-pixel regions 302, 304, 306, 308, in which the sub-pixel regions 302, 304, 306 are the transmission regions as the color sub-pixel regions, and the sub-pixel region 308 is the reflective region as the colorless sub-pixel region. In the present invention, the photo-spacer 310 is disposed in the sub-pixel region 308 shown in FIG. 5. The photo-spacer 310 can be disposed in the substantially center of the sub-pixel region 308, disposed between the sub-pixel region 306 and the sub-pixel region 308, as shown FIG. 15, or in the sub-pixel region 308 and adjacent to the sub-pixel region 306, as shown in FIG. 14. In additional, the photo-spacer 308 can also be disposed between the sub-pixel region 308 and any one of the sub-pixel regions adjacent to the sub-pixel region 308. The shape of the photo-spacer 308 can be substantially columnar, a substantially cone shaped, or another substantially shape, but not limited in the shape of the FIG. 14 and FIG. 15. Referring to FIG. 16 and FIG. 17 shows the top view of the embodiment of FIG. 6 with the photo-spacer 310. In FIG. 16, the photo-spacer 310 is disposed in the substantially center of the colorless sub-pixel region 914. In FIG. 17, a plurality of photo-spacers 310 are disposed between the colorless sub-pixel region 914 and any one of the sub-pixel regions adjacent to the colorless sub-pixel region 914.

It is noteworthy that the photo-spacer 310 in the present invention is disposed in the colorless sub-pixel region 308 or between the color sub-pixel region 306 and the colorless sub-pixel region 308. Thus, the open ratio and the performance of the color sub-pixel region will be maintained. In the traditional technology, the photo-spacer is disposed in any color sub-pixel region. If the photo-spacer is disposed in the red sub-pixel region, in order to display white light with, a covered areas by other's cover must in the green and blue sub-pixel regions equal to the area of the photo-spacer covers in the red sub-pixel region, so as to obtain the transmittance R:G:B=1:1:1. But, in this way, the open ratio of the panel is decreased. In contrast, the photo-spacer in the present invention is disposed in the colorless sub-pixel region, or between the color sub-pixel region and the colorless sub-pixel region, such that the open ratio and the performance of the color sub-pixel regions are maintained.

Figure 18:
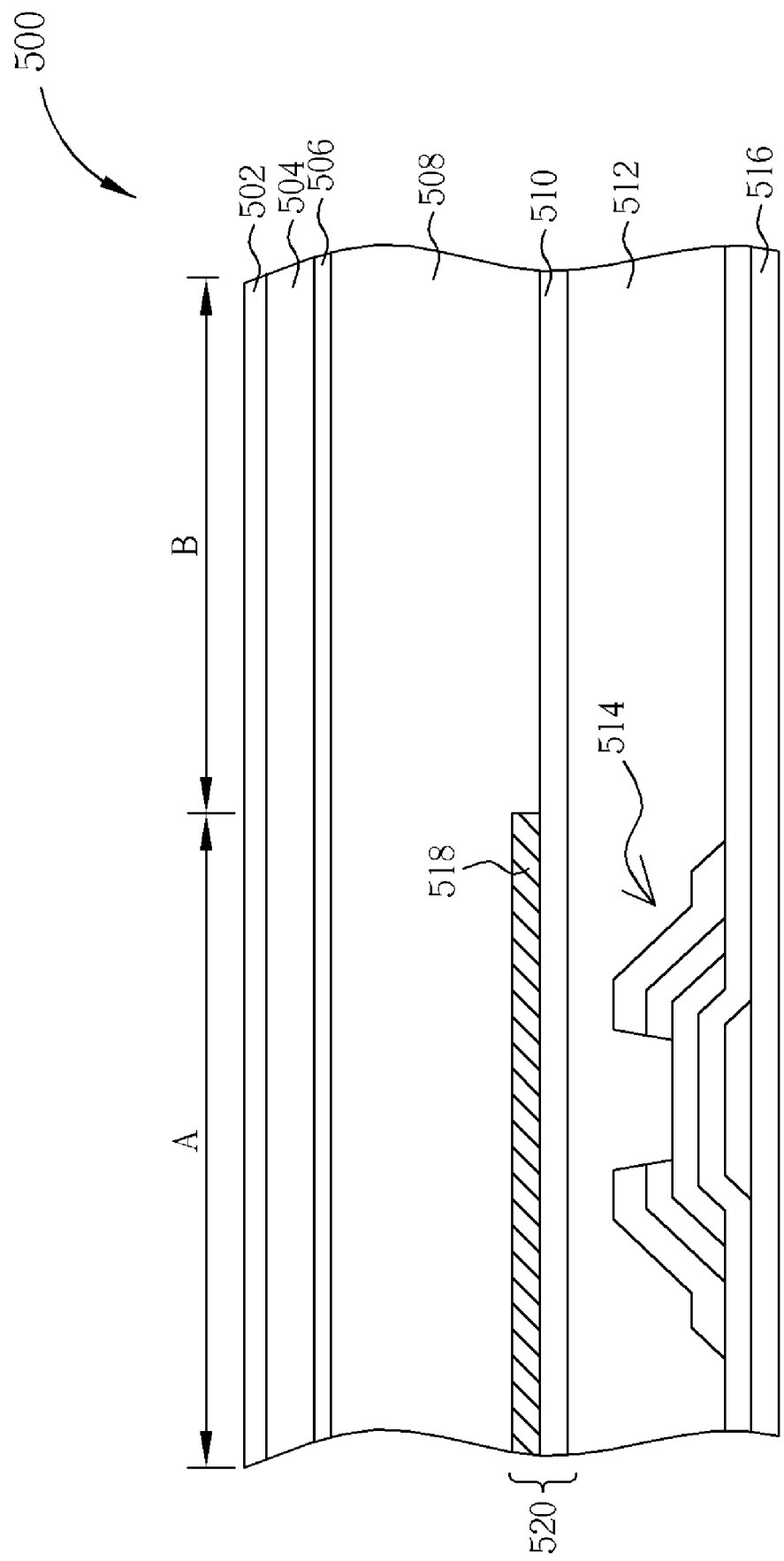
FIG. 18 to FIG. 19 are schematic diagrams of structure of color filter in the present invention.
Figure 19:
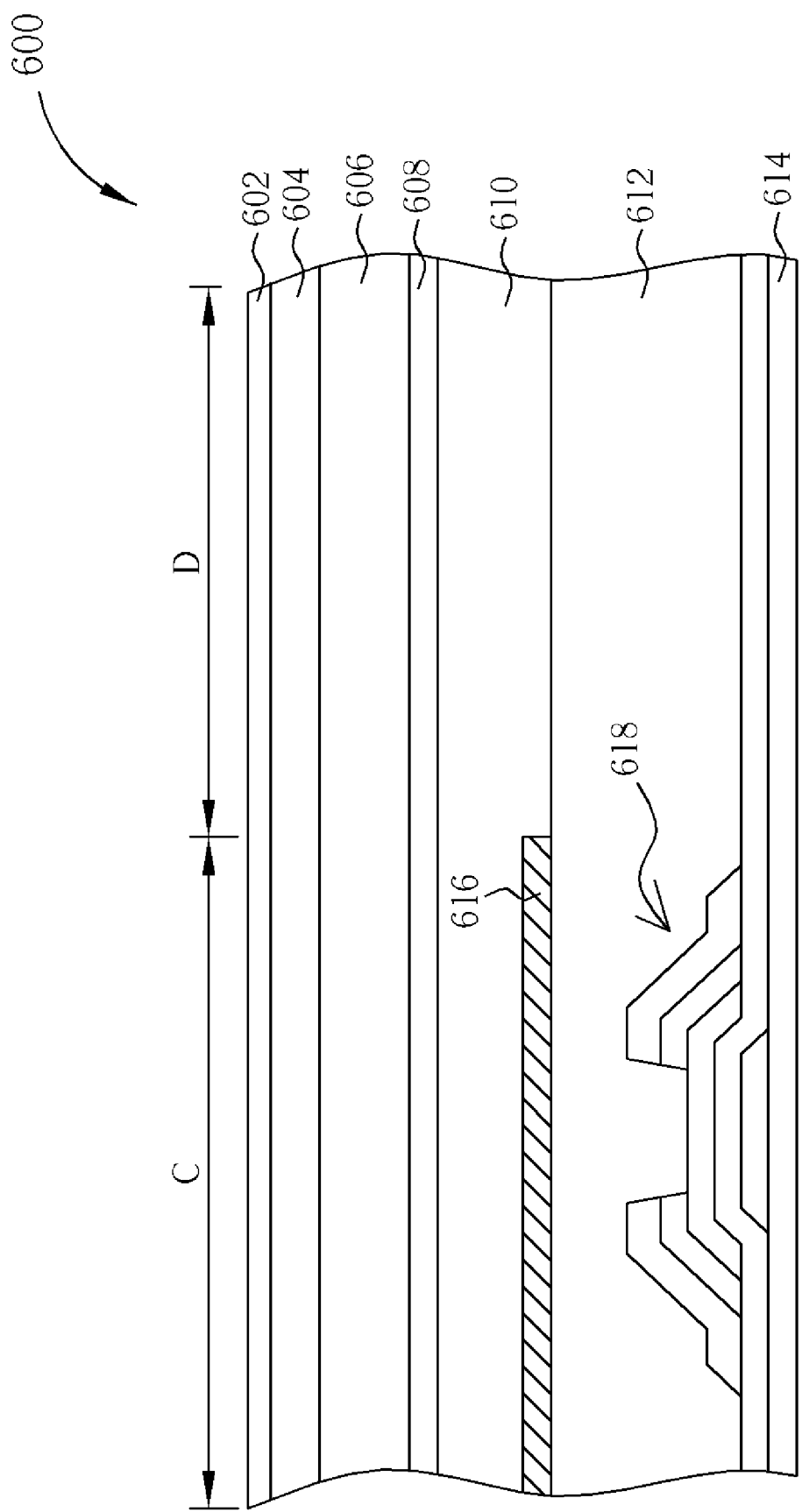

Moreover, based on different places where the color filter is disposed, more variations are possible for the present invention. FIG. 18 to FIG. 19 are schematic diagrams of structure in FIG. 10 with a color filter applied. As shown in FIG. 18, taking one sub-pixel region of the pixel region 206 as an example, the transflective LCD 500 comprises a first substrate 502, a color filter 504, a common electrode 506, a crystal liquid (LC) layer 508 with a plurality of LC molecules, a pixel electrode 510, a dielectric layer 512, and a second substrate 516. One of the sub-pixel regions of the pixel region 206 is separated into a reflective region A and a transmission region B. The reflective region A comprises a colorless sub-pixel region, and the transmission region B comprises a color sub-pixel region. In addition, the reflective region A comprises a reflective electrode 520 comprising a metal material of a reflective layer 518 and a transparent material of the pixel electrode 510. A thin film transistor is under the reflective electrode 520. Furthermore, the present invention can be applied to a substrate having color filters integrated with a thin film transistor array, e.g. a color filter-on-array (COA) structure or an array-on-color filter (AOC) structure. FIG. 19 is a schematic diagram of the structure in FIG. 10 with the COA structure in the present invention. As shown in FIG. 19, taking one sub-pixel region of the pixel region 206 as an example, the transflective LCD 600 comprises a first substrate 602, a color filter 604, a common electrode 606, a crystal liquid layer 608 with a plurality of molecules, a pixel electrode 610, a dielectric layer 612, and a second substrate 614. One of the sub-pixel regions of the pixel region 206 is separated into a reflective region C and a transmission region D. The reflective region C comprises a colorless sub-pixel region, and the transmission region D comprises a color sub-pixel region. In addition, the reflective region C comprises a metal material of the reflective layer 616 as a part of the reflective electrode. A thin film transistor 618 is under the reflective layer 616. Furthermore, the first substrate 502, 602 and the second substrate 516, 614 comprise transparent materials, semi-transparent materials, and opaque materials.

Figure 20:
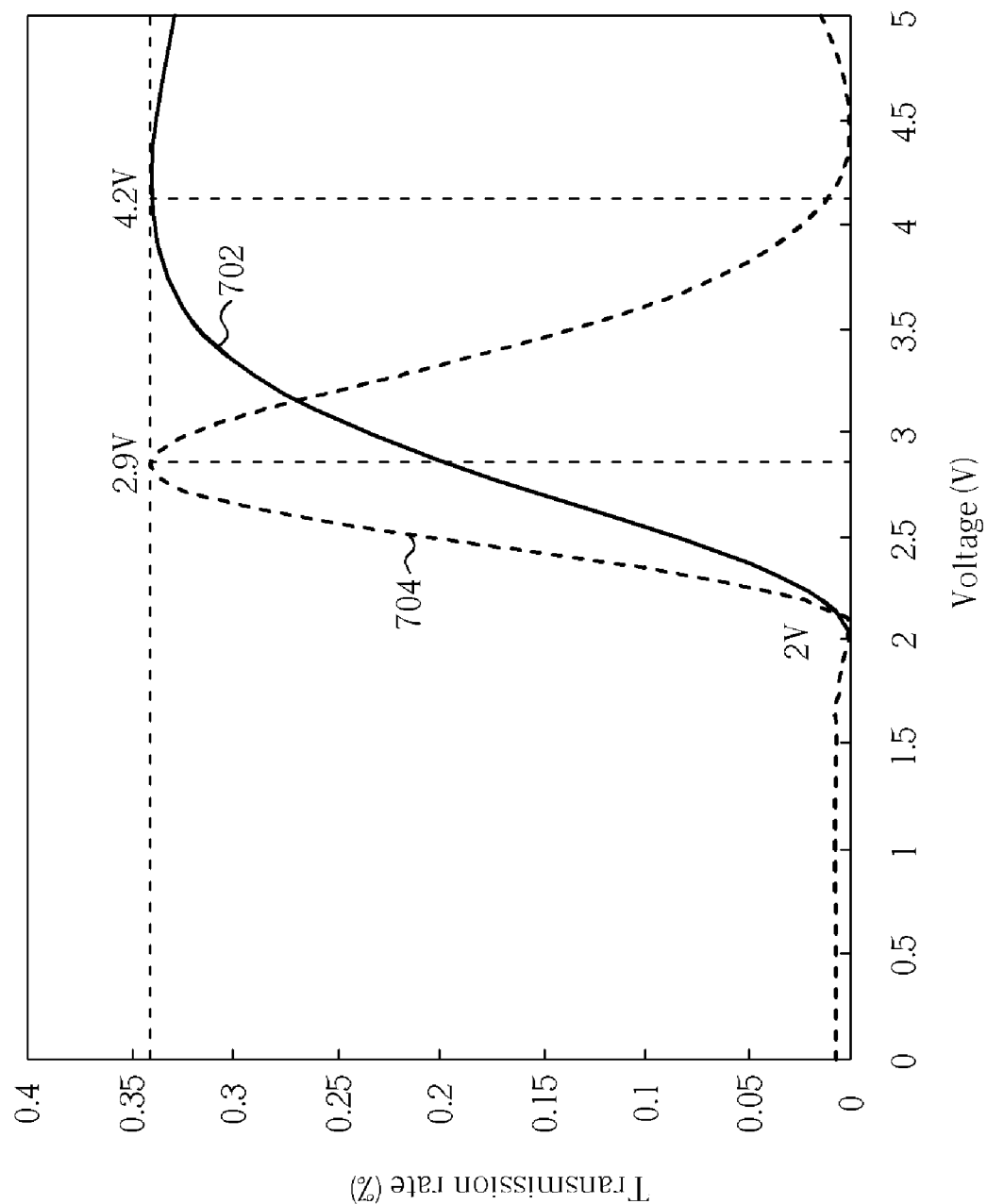
FIG. 20 is diagram of voltage vs. transmittance of colorless and color sub-pixel regions in the present invention.

Referring to FIG. 20 is a diagram of voltage vs. transmittance also known as voltage vs. transmittance of the colorless and color sub-pixel regions in the present invention. The colorless and color sub-pixel regions in the present invention can be driven by substantially different voltages, and the voltage-transmittance (VT) curve of the colorless sub-pixel region is substantially different from the VT curve of the color sub-pixel region. As shown in FIG. 20, the color sub-pixel 702 reaches an optimum transmittance at about 4.2V, whereas the colorless sub-pixel 704 reaches its optimum transmittance at about 2.9V. Referring to FIG. 21 is a diagram of a gray-scale of the colorless and color sub-pixel regions vs. driving voltage of the colorless and color sub-pixel regions in the present invention. Because the VT curve is substantially different for the colorless and color sub-pixel regions, when the gray-scale is high, the difference in driving voltage between the colorless sub-pixel region 802 and the color sub-pixel region 804 will be large. In the present invention, the colorless sub-pixel region and the color sub-pixel region can be driven by substantially different voltages, so the colorless sub-pixel region and the color sub-pixel region can be controlled independently to improve display quality.

In the transflective LCD, light from the transmission region only passes through the liquid crystal layer once, but the light from the reflective region passes through the liquid crystal layer twice. In order to reach the optimum transmittance in both the transmission region and the reflective region, substantially different driving voltages are applied, respectively. In the traditional technology, a dual gap is fabricated between the liquid crystal layer in the transmission region and the reflective region, and the same voltage is applied to drive the transmission region and the reflective region to achieve better performance, but the way is complicated processes, higher cost, lower yield, and so on. In contrast, in the present invention, preferred, the liquid crystal layer has the same height in the transmission region and the reflective region (such as single gap), and a substantially different driving voltage is applied to make the transmission region and the reflection region can to improve the traditional technology problem that the gamma curve in the transmission region and the reflection region is not match and to achieve higher performance, to reach the optimum transmittance in both the transmission region and the reflective region, simple processes, and so on, but not limited the single gap, maybe can to apply in the dual gap structure to achieve display quality is substantially equal to the display quality of the single gap structure.

The transflective display of the present invention either can be applied to liquid crystal displays (LCDs) or can be applied to electro-luminescence displays (such as organic light emitting displays (OLED), inorganic light emitting displays, polymer light emitting diodes (PLED), inorganic light emitting displays). The different of the LCDs and electro-luminescence displays is whether applied process comprising the liquid crystal layer with a plurality of liquid crystal molecules or a light source (not shown). When applied to electro-luminescence displays (ELDs), most of the design of the present invention does not change, but an illuminant layer (not shown) needs to be placed on the pixel regions.

Moreover, the above-mentioned embodiment of the present invention of the photo-spacer and alignment devices (such as slits, protrusions, or combinations), can be disposed on one of the first substrate and the second substrate. In other words, if the alignment device comprises protrusions, it can be disposed on either the first substrate or the second substrate, and the photo-spacer can be disposed on either the first substrate or the second substrate. If the alignment device comprises protrusions and slits, the protrusions are disposed on the first substrate and the slits are disposed on the second substrate, and the photo-spacer can be disposed on either the first substrate or the second substrate. If the alignment device comprises slits, the slits can be disposed on either the first substrate or the second substrate, and the photo-spacer can be disposed on either the first substrate or the second substrate.

The thin film transistors controlling the color and colorless sub-pixel regions are disposed in the reflective region of the colorless sub-pixel region so the open ratio of transmission regions of the color sub-pixel regions can be increased. Further, preferred, the photo-spacer is disposed in the colorless sub-pixel region, so the open ratio of the sub-pixel regions can be increased. In addition, preferred, the transmission region and the reflective region are driven by substantially different voltage, so both of them can reach the best transmittance. So, the above-mentioned embodiments of the present invention can improve the open ratio of the pixel region in the display and achieve the preferred display quality.

Those skilled in the art will readily observe that numerous modifications and alterations of the device and method may be made while retaining the teachings of the invention.

What is claimed is:

1. A transflective liquid crystal display (LCD), comprising:
a plurality of scan lines disposed along a first direction on a substrate;
a plurality of data lines, disposed along a second direction on the substrate, so that a plurality of pixel regions comprising a plurality of sub-pixel regions defined by the data lines and the scan lines, and at least three of the sub-pixel regions are as a color sub-pixel regions and at least one of the sub-pixel regions is as a fourth sub-pixel region, wherein the color sub-pixel regions are a transmission region within a transmissive electrode; and
a plurality of switch devices adapted to control the color sub-pixel regions and the fourth sub-pixel region, respectively, and each of the plurality of the switch devices has one portion located within the fourth sub-pixel region.

2. The LCD of claim 1, wherein at least one of the plurality of the switch devices has one portion which is located within the fourth sub-pixel region as well as within at least one of the color sub-pixel region which is adjacent to the fourth sub-pixel region.

3. The LCD of claim 1, wherein the fourth sub-pixel region comprises a reflective region with a reflective electrode.

4. The LCD of claim 1, wherein the fourth sub-pixel region comprises a transmissive region with a transmission electrode and a reflective region with a reflective electrode.

5. The LCD of claim 1, further comprising a plurality of common electrodes, disposed along the second direction on the substrate, and substantially parallel to the scan lines.

6. The LCD of claim 5, wherein at least one of the common electrodes, is disposed between the scan lines, and passes one of the color sub-pixel regions and the fourth sub-pixel region.

7. The LCD of claim 1, further comprising at least one photo-spacer disposed in the fourth sub-pixel region.

8. The LCD of claim 7, wherein the photo-spacer is disposed in the substantially center of the fourth sub-pixel region.

9. The LCD of claim 1, further comprising at least one photo-spacer disposed between the fourth sub-pixel region and one of the color sub-pixel regions.

10. The LCD of claim 1, further comprising at least one first alignment device disposed in one of the color sub-pixel regions.

11. The LCD of claim 10, further comprising at least one second alignment device disposed in one of the color sub-pixel regions.

12. The LCD of claim 1, further comprising at least one second alignment device disposed in one of the color sub-pixel regions.

13. The LCD of claim 1, further comprising a color filter corresponding to the substrate comprising a plurality of regions with a plurality of sub-regions, wherein at least three of the sub-regions are as a color sub-regions corresponding to the color sub-pixel regions on the substrate, and at least one of the sub-regions is as a fourth sub-region corresponding to the fourth sub-pixel region on the substrate.

14. The LCD of claim 1, further comprising a color filter disposed on the substrate comprising a plurality of regions with a plurality of sub-regions, wherein at least three of the sub-regions are as a color sub-regions corresponding to the color sub-pixel regions on the substrate, and at least one of the sub-regions is as a fourth sub-region corresponding to the fourth sub-pixel region on the substrate.

15. The LCD of claim 1, wherein voltages are applied to the sub-pixel regions, and the voltage of the fourth sub-pixel region is substantially different from the voltage of the color sub-pixel regions to reach the optimum transmittance in both the color sub-pixel regions and the fourth sub-pixel region.

16. The LCD of claim 15, wherein a voltage-transmission (VT) curve of the fourth sub-pixel region transferred by the data lines is substantially different from an VT curve of the color sub-pixel regions transferred by the data lines.

17. The LCD of claim 1, wherein the transmissive electrode of the color sub-pixel regions, crosses at least one of any one of the data lines or any one of the scan lines, and is electrically coupled to the switch devices.

18. A transflective liquid crystal display (LCD), comprising:
   a substrate;
   a plurality of scanlines disposed along a first direction on the substrate;
   a plurality of data lines, disposed along a second direction on the substrate, so that a plurality of pixel regions comprising a plurality of sub-pixel regions are defined by the data line and the scan lines, and at least three of the sub-pixel regions are as a color sub-pixel regions and at least one of the sub-pixel regions corresponding to the color sub-pixel regions is as a fourth sub-pixel region, wherein the color sub-pixel regions are a transmission region within a transmissive electrode; and
   a plurality of switch devices adapted to control the color sub-pixel regions and the fourth sub-pixel region, respectively, and each of the plurality of the switch devices has one portion located within the fourth sub-pixel region.

19. The LCD of claim 18, wherein at least one of the plurality of the switch devices has one portion which is located within the fourth sub-pixel region as well as within at least one of the color sub-pixel region which is adjacent to the fourth sub-pixel region.

20. The LCD of claim 18, wherein the fourth sub-pixel region comprises a reflective region with a reflective electrode.

21. The LCD of claim 18, wherein the fourth sub-pixel region comprises a transmissive region with a transmission electrode and a reflective region with a reflective electrode.

22. The LCD of claim 18, further comprising a plurality of common electrodes, disposed along the second direction on the substrate, and substantially parallel to the scan lines.

23. The LCD of claim 22, wherein at least one of the common electrodes is disposed between the scan lines, and passes through the fourth sub-pixel region.

24. The LCD of claim 18, further comprising at least one photo-spacer disposed in the fourth sub-pixel region.

25. The LCD of claim 24, wherein the photo-spacer is disposed in the substantially center of the fourth sub-pixel region.

26. The LCD of claim 18, further comprising at least one photo-spacer disposed between one of the transmission region of the color sub-pixel regions and the fourth sub-pixel region corresponding to any one of the color sub-pixel regions.

27. The LCD of claim 18, further comprising at least one first alignment device disposed in one of the color sub-pixel regions.

28. The LCD of claim 27, further comprising at least one second alignment device disposed in one of the color sub-pixel regions.

29. The LCD of claim 18, further comprising at least one second alignment device disposed in one of the color sub-pixel regions.

30. The LCD of claim 18, further comprising a color filter corresponding to the substrate comprising a plurality of regions with a plurality of sub-regions, wherein at least three of the sub-regions are as a color sub-regions corresponding to the color sub-pixel regions on the substrate, and at least one of the sub-regions is as a fourth sub-region corresponding to the fourth sub-pixel region on the substrate.

31. The LCD of claim 18, further comprising a color filter disposed on the substrate comprising a plurality of regions with a plurality of sub-regions, wherein at least three of the sub-regions are as a color sub-regions corresponding to the color sub-pixel regions on the substrate, and at least one of the sub-regions is as a fourth sub-region corresponding to the fourth sub-pixel region on the substrate.

32. The LCD of claim 18, wherein voltages are applied to the sub-pixel regions, and the voltage of the fourth sub-pixel region is substantially different from the voltages of the transmission region of the color sub-pixel regions to reach the optimum transmittance in both the color sub-pixel regions and the fourth sub-pixel region.

33. The LCD of claim 32, wherein a voltage-transmission (VT) curve of the fourth sub-pixel region transferred by the data lines is substantially different from an VT curve of the transmission region of the color sub-pixel regions transferred by the data lines.

34. The LCD of claim 18, wherein the transmissive electrode of the color sub-pixel regions, crosses at least one of any one of the data lines and any one of the scan lines, and is electrically coupled to the switch devices.

35. The LCD of claim 1, wherein all of the plurality of the switch devices are located within the fourth sub-pixel region.

36. The LCD of claim 18, wherein all of the plurality of the switch devices are located within the fourth sub-pixel region.

* * * * *